US012646993B2

(12) United States Patent
Hoeke et al.

(10) Patent No.: US 12,646,993 B2
(45) Date of Patent: Jun. 2, 2026

(54) ELECTRIC MOTOR FOR A DEEP WELL VERTICAL TURBINE PUMP WITH THE CORRESPONDING MANUFACTURING METHOD AND TOOL

(71) Applicant: WILO SE, Dortmund (DE)

(72) Inventors: Daniel Hoeke, Dortmund (DE); Oliver Drubel, Dortmund (DE); Henry Kohler, Dortmund (DE); Roland Edmund Ummelmann, Dortmund (DE); Heiko Doehler, Dortmund (DE); Heiko Unger, Dortmund (DE); Volker Netsch, Dortmund (DE); Michael Meier-Wagner, Dortmund (DE); Martin Vogt, Dortmund (DE); Marco Lux, Dortmund (DE); Dino Raeder, Dortmund (DE)

(73) Assignee: WILO SE, Dortmund (DE)

( * ) Notice: Subject to any disclaimer, the term of this patent is extended or adjusted under 35 U.S.C. 154(b) by 292 days.

(21) Appl. No.: 18/374,752

(22) Filed: Sep. 29, 2023

(65) Prior Publication Data

US 2024/0146141 A1     May 2, 2024

(30) Foreign Application Priority Data

Oct. 25, 2022    (EP) .................................... 22203675

(51) Int. Cl.
 *H02K 3/50*      (2006.01)
 *F04D 13/10*     (2006.01)
 *H02K 15/26*     (2025.01)

(52) U.S. Cl.
 CPC ............... *H02K 3/50* (2013.01); *F04D 13/10* (2013.01); *H02K 15/26* (2025.01)

(58) Field of Classification Search
 CPC .......... F04D 13/10; H02K 3/12; H02K 15/50; H02K 15/26; H02K 15/067; H02K 3/50
 See application file for complete search history.

(56) References Cited

U.S. PATENT DOCUMENTS

| | | | | |
|---|---|---|---|---|
| 2,743,508 A | * | 5/1956 | Isaacson | H02K 15/067 |
| | | | | 29/605 |
| 5,619,787 A | * | 4/1997 | Couture | H02K 15/066 |
| | | | | 29/596 |

(Continued)

FOREIGN PATENT DOCUMENTS

| | | | |
|---|---|---|---|
| DE | 10 2017 119 838 A1 | 3/2018 | |
| WO | WO-2018041836 A1 * | 3/2018 | H02K 15/068 |

OTHER PUBLICATIONS

WO-2018041836-A1 machine translation on Sep. 20, 2025.*

*Primary Examiner* — Leda T Pham
(74) *Attorney, Agent, or Firm* — Norris McLaughlin, P.A.

(57)     ABSTRACT

An electric motor as well as a manufacturing method for the electric motor and a manufacturing tool are provided, the electric motor being for a deep well vertical turbine pump and having a stator assembly that has a stator bore to hold a rotor and slots that are radially open to the inside, respectively separated from each other by a stator tooth, and in which electrical conductors made of round wire of coils of a coil assembly lie, with the distributed windings on one axial end of the coil assembly forming a winding head in which the coils are encapsulated. The winding head only extends between an inner diameter and an outer diameter which is smaller than the diameter of the stator bore in which the coil assembly is inserted axially into the slots of the stator assembly.

19 Claims, 23 Drawing Sheets

(56) References Cited

U.S. PATENT DOCUMENTS

Figures 1A, 1B, 1C:
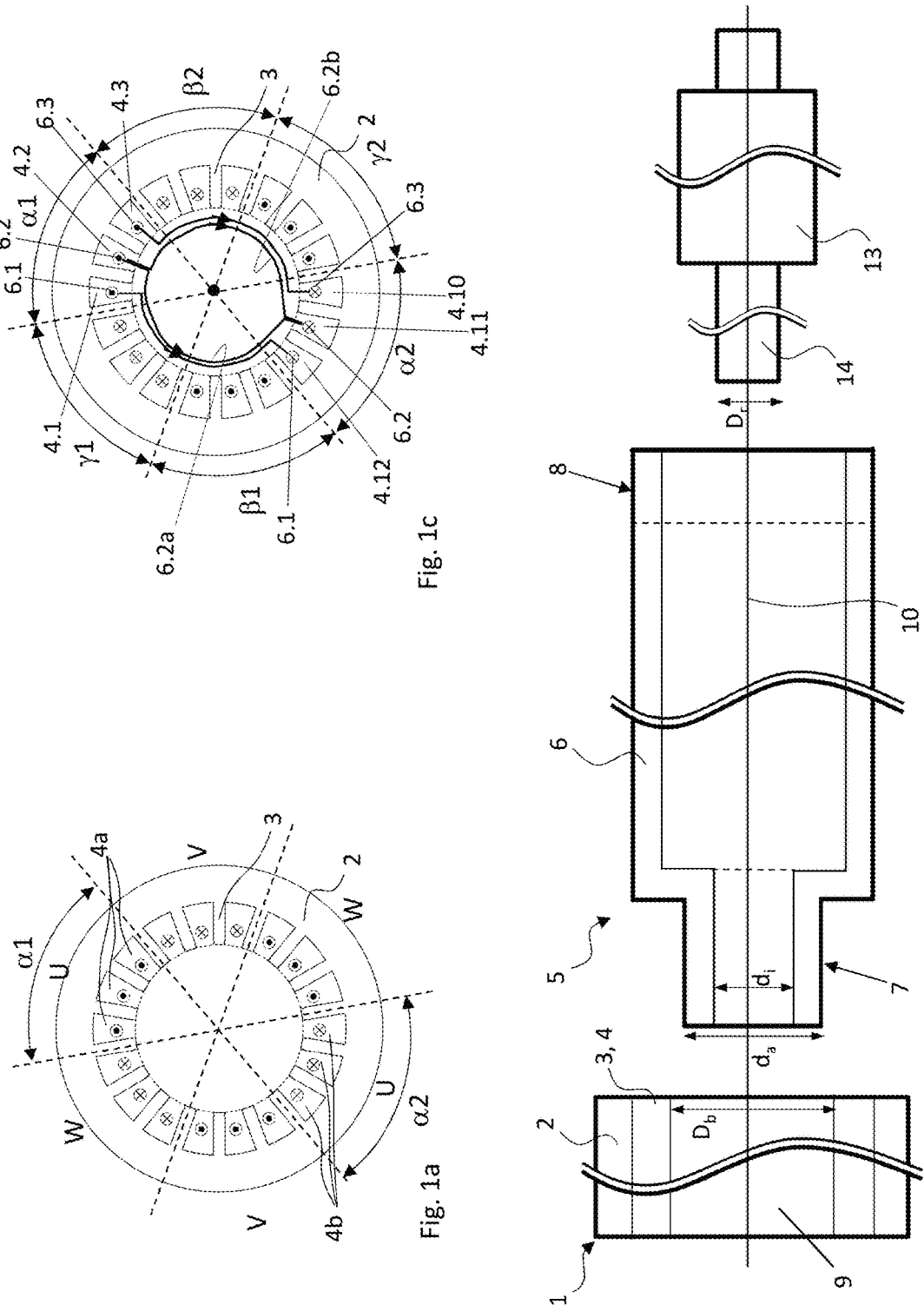

| | | | |
|---|---|---|---|
| 7,825,562 B2 * | 11/2010 | Naganawa | H02K 15/063 |
| | | | 310/184 |
| 10,461,591 B2 * | 10/2019 | Sakaue | H02K 15/085 |
| 2001/0017332 A1 | 8/2001 | Katsuzawa et al. | |
| 2014/0191602 A1 | 7/2014 | Hardway et al. | |
| 2016/0156240 A1 | 6/2016 | Shimozu et al. | |
| 2016/0359388 A1 | 12/2016 | Strattan et al. | |

* cited by examiner

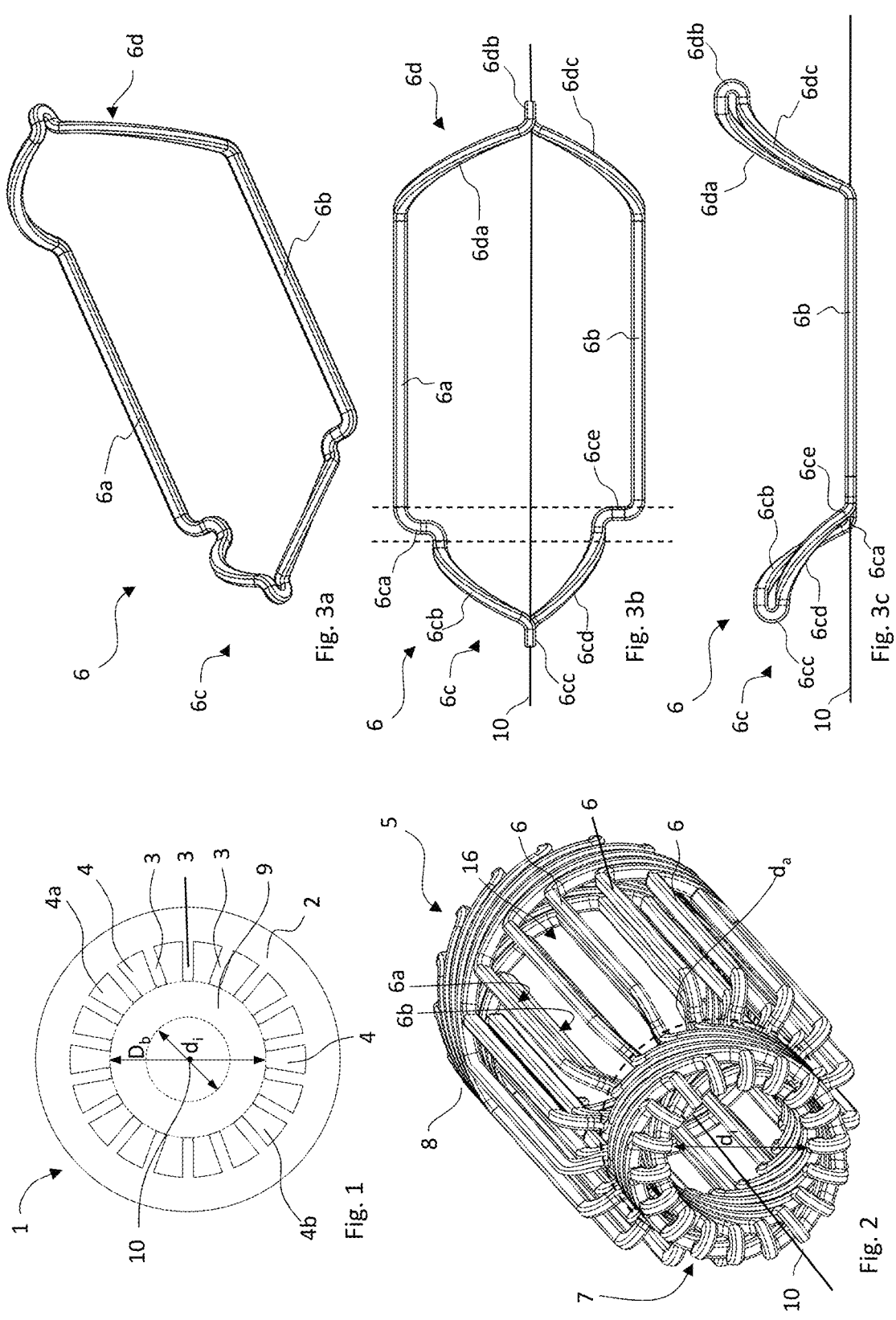

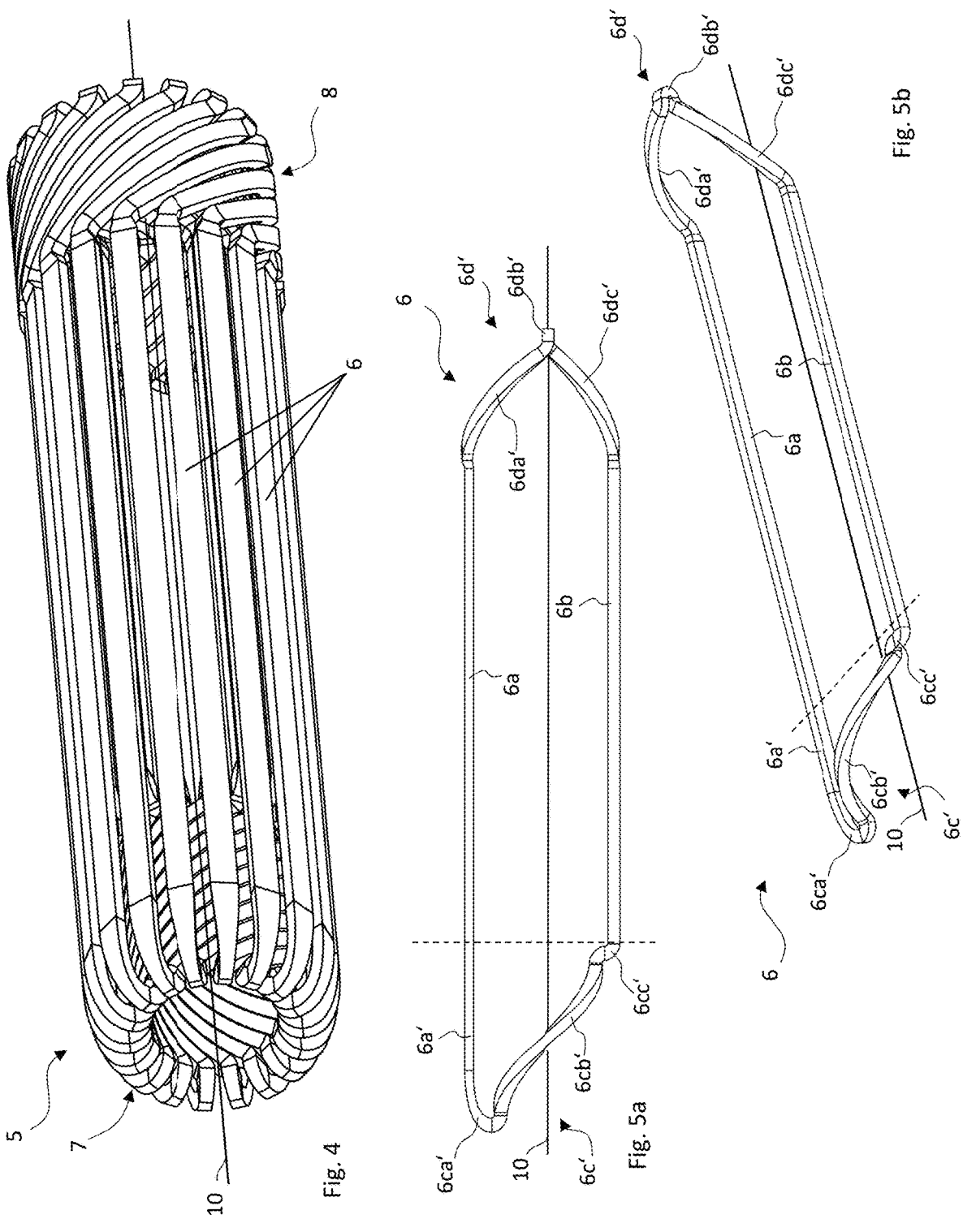

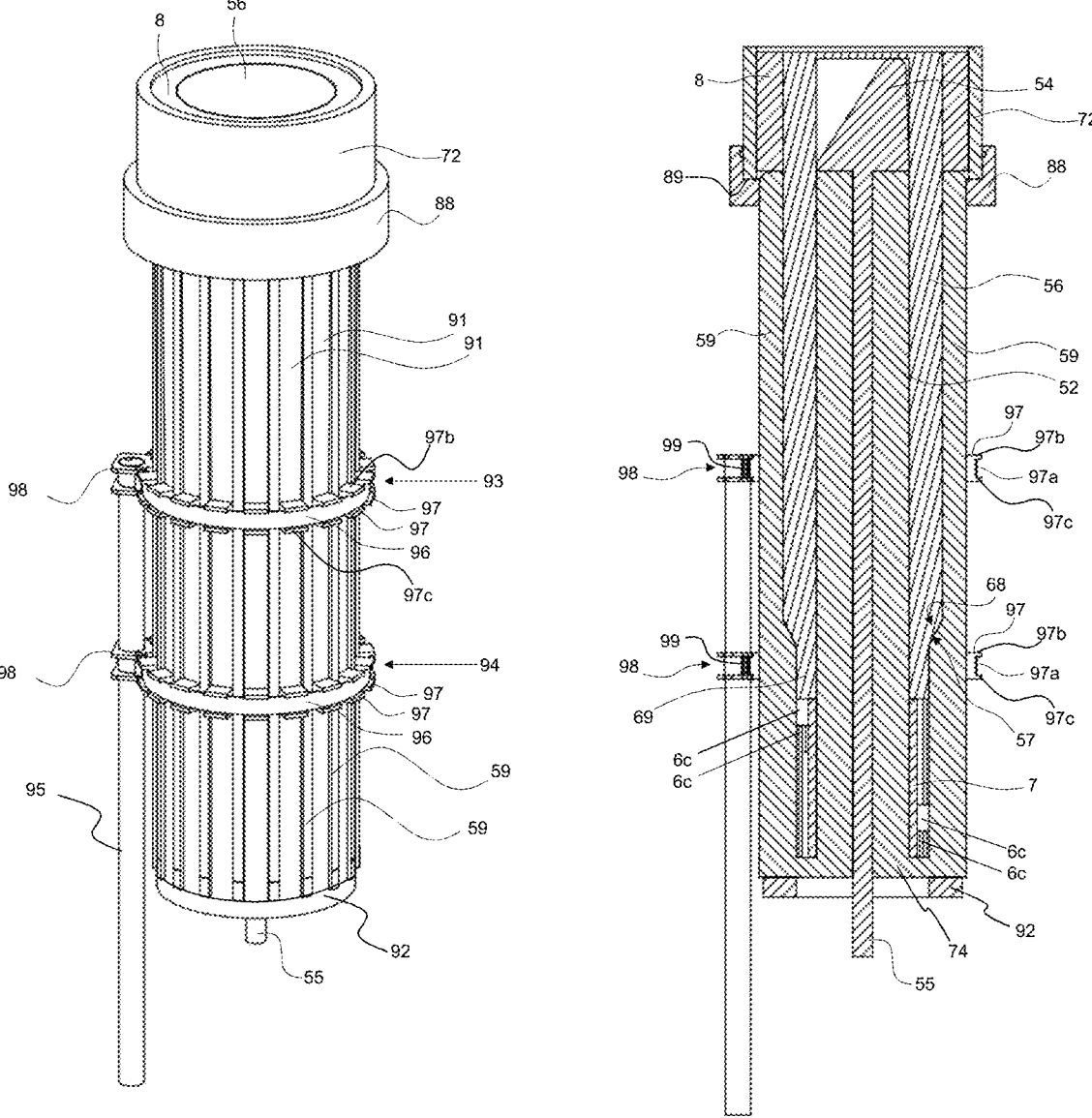
Fig. 12f                                    Fig. 13b

ELECTRIC MOTOR FOR A DEEP WELL VERTICAL TURBINE PUMP WITH THE CORRESPONDING MANUFACTURING METHOD AND TOOL

The invention relates to an electric motor for a deep well vertical turbine pump with a stator assembly that has a stator bore to hold a rotor and slots that are radially open to the inside, respectively separated from each other by a stator tooth, and in which electrical conductors made of round wire of coils of a coil assembly lie, with the distributed windings on one axial end of the coil assembly forming a winding head, in which the coils are encapsulated. In addition, the invention relates to a method and a tool for manufacturing the electric motor.

Deep well vertical turbine pumps have an elongated, essentially cylindrical shape. They have a pump head driven by an electric motor, in which the pump head and the electric motor are installed in a single, cylindrical casing or in different casings with approximately the same outer diameter, for insertion into a well in accordance with their purpose. Thus the outer diameter of a deep well vertical turbine pump defines its range of use. It is small compared to the axial length of the deep well vertical turbine pump, often less than 20 cm. As a rule, deep well vertical turbine pumps with motors of various ratings and the same outer diameter therefore have different motor lengths, for example, up to 1.5 m in order to provide the required output.

Since the electric motor is also under high pressure of up to 50 bar, high quality standards apply for deep well vertical turbine pumps and their electric motors. Air pockets in deep well vertical turbine pumps are detrimental due to the ambient pressure. Wet rotor motors are therefore used in this application. This means that the rotor, which is typically equipped with permanent magnets as in a synchronous motor, rotates in the liquid being pumped or in another liquid. As a rule, the stator is encapsulated or also flooded by the liquid being pumped.

In the flooded version, the electrical conductors lying in the stator slots are usually what are known as submarine cables. These are bundles of copper conductors that are sheathed with synthetic material and therefore waterproof. Their synthetic insulation has a relatively large radial thickness of approx. 0.5 mm, increasing the overall diameter of a conductor bundle with a thickness of 1 mm to the size of the submarine cable at approx. 2 mm. From this it follows that a large proportion of the slot cross-section is needed for the insulation. Viewed differently, the slot cannot be filled with copper due to the insulation of the submarine cable. Consequently, this version has a lower filling factor and therefore requires a larger axial installation length to obtain a certain output than an electric motor with an encapsulated stator. Encapsulation means the plastic sheathing of the electrical conductors can be omitted, so that more electrical conductors fit into the slot cross-section. Electric motors with an encapsulated stator therefore have a higher power density with a larger copper cross-section in a stator slot.

The material used for encapsulation is typically a casting resin that fills the cavities between the unsheathed electrical conductors and between the electrical conductors and the stator assembly. The electrical conductors are encapsulated directly in the stator assembly, so that the casting resin also coats the stator assembly, if applicable penetrating it at least in part when it consists of individual plates in the usual manner, and/or even encapsulating the stator assembly entirely. Thus the stator forms a unit in which the coils are encapsulated.

A disadvantage of the encapsulated version is that the electric motor cannot be repaired, since non-destructive separation of the electrical part of the stator from the purely mechanical part, i.e. the stator assembly, is not possible. Instead the entire stator has to be disposed of in case of a defect, which is a disadvantage because mono-fraction recycling is not possible.

Motors wound using submarine cables on the other hand can be repaired by removing the submarine cables and simply rewinding the stator assembly with new submarine cables. However, the cables are very expensive and, as previously explained, reduce the degree of filling/copper cross-section in the slots. This results in a larger axial installation length of the motor and the deep well vertical turbine pump for the same output compared to the encapsulated type. Consequently it is currently not possible to rewind deep well vertical turbine pumps with a larger copper cross-section in the slots.

Thus one purpose of the present invention is to overcome these disadvantages and to provide an electric motor for a deep well vertical turbine pump that can be produced at low cost, delivers a high power density with a low axial installation length, and can be repaired in case of a defect. The purpose of the invention is also to provide a method and a tool for manufacturing the electric motor according to the invention.

This purpose is achieved by an electric motor according to claim 1, a method according to claim 9 and a tool according to claim 17. Advantageous embodiments of the electric motor, the method and the tool are outlined in the corresponding dependent claims and are explained below.

The present invention proposes an electric motor for a deep well vertical turbine pump with a stator assembly that has a stator bore to hold a rotor and slots that are radially open to the inside, respectively separated from each other by a stator tooth, and in which electrical conductors made of round wire of coils of a coil assembly lie, with the distributed windings on one axial end of the coil assembly forming a winding head, in which the coils are encapsulated. According to the present invention, the winding head only extends between an inner diameter and an outer diameter, which is smaller than the diameter of the stator bore, and the coil assembly is inserted axially into the slots of the stator.

The following steps are proposed for the method for manufacturing an electric motor according to the present invention:

Providing a stator assembly that has a stator bore to hold a rotor and slots that are radially open to the inside, respectively separated from each other by a stator tooth, manufacturing a coil assembly of encapsulated coils or by encapsulating coils made by winding round wire electrical conductors so that the coils form distributed windings and, at one axial end of the coil assembly, a winding head that extends only between an inner diameter and an outer diameter that is smaller than the diameter of the stator bore, and axially inserting the coil assembly into the stator assembly, leading with the winding head, so that the coils are positioned to lie in the slots.

Thus the core of the invention consists of manufacturing the coil assembly ex situ and then inserting it axially into the stator as a whole. This means the coils are not inserted individually. To permit axial insertion, the winding head is radially offset to the inside into the stator bore relative to the stator slots, respectively relative to the stator teeth, so that the winding head is not aligned with the stator teeth or, in other words, so that the stator teeth and the winding head do not interfere with each other during axial joining. Thus the coil assembly can be easily inserted into the stator assembly. It can also be easily pulled out of the stator again and therefore can be changed in case of a defect.

The winding head comprises the whole of the segments of all coils of an electric motor with distributed windings that lie on one axial end of the stator and in which the axial-side coil segments of the individual coils lie axially above each other to extend from one slot to the next slot.

A distributed winding means the winding type of a coil of a phase whose windings are distributed across at least two stator slots that are separated by each other in space by more than one stator tooth. In other words, the at least two stator slots lie in angle segments at some distance from each other, in which additional angle segments with slots exist between the aforesaid angle segments with the windings of the coils of the other phases lying in them. For example, the two aforementioned stator slots in case of a two-pole, 3-phase machine lie in opposite angle segments of respectively 60°. Thus a distributed winding is differentiated from a concentrated winding that is wound around a single stator tooth or whose windings are arranged around it.

The coil assembly according to the invention has the advantage that it can be prefabricated with its encapsulated distributed windings and axially inserted into the stator assembly. This enables the straightforward, fast and cost-effective manufacturing and repair of electric motors for deep well vertical turbine pumps with distributed windings, respectively of deep well vertical turbine pumps as such.

The proposed new motor design with its coils manufactured and encapsulated outside the stator assembly combines the high power density of encapsulated systems with the ability to replace the stator winding and/or the coil assembly when needed. Due to the novel coil assembly, remaking the stator with the coils or the coil assembly is also faster than rewinding the stator assembly with submarine cables.

An unsheathed winding wire is logically used to manufacture the coils in order to fill the slot cross-section with the maximum of current conductors.

A copper winding wire coated with an insulating varnish can be used in the known manner. Alternatively a wire made of a different metal such as aluminium could be used as well.

To keep coil manufacturing simple, the winding wire is a round wire in the known manner, ideally with a diameter between 0.6 mm and 2 mm.

The winding wire is used to produce a number of individual coils with a number of windings by correspondingly winding the wire along a closed ring. Where applicable, the required coil shape can be formed simultaneously, at least approximately. Insofar as the coil shape produced during winding as such is not yet suitable for insertion into the stator assembly, a wound coil (raw coil) can be brought into the required final coil shape by a mechanical shaping process.

A self-adhesive winding wire can be used to make the wound coils inherently stable. The winding wire may be coated with a thermosetting varnish where required. Heating the coil after winding cements the windings with each other, also making the coils inherently stable.

The wound coils, shaped where required and made inherently stable where required, are subsequently encapsulated to meet the insulation requirements in the deep well vertical turbine pump.

In one embodiment, the coil assembly can be formed by or made of individually encapsulated coils (single coils) that are subsequently assembled to form the coil assembly. This is done by nesting the single coils inside each other. Then the coil assembly made of encapsulated single coils is axially inserted into the stator assembly, i.e. either pushed or pulled in.

The individual encapsulated coils can be nested by first placing them in a row, arranged in a fan shape, so that the longitudinal axis of each coil is approximately aligned with a common central point, which in case of a fan forms its pin, and each coil partly overlaps the coil lying behind it, in which the winding head segments forming the winding head lie against each other near the central point. In contrast, the coil segments across from the winding head, collectively forming a second winding head, are radially further away from the central point and also from each other in the circumferential direction around the central point, so that the aforementioned fan shape is formed overall.

The coils thus positioned relative to each other are then brought into a closed cone shape and from there into a cylinder shape. This is done by bringing together the side flanks of the fan-shaped coil arrangement, meaning the right outer longitudinal segment of the first coil and the left outer longitudinal segment of the last coil, folding them up in the process. The coil segments forming the second winding head can be brought closer together at the same time. To maintain the shape of the coil arrangement during this forming step, a forming tool in the shape of a funnel or at least a half funnel can be used, in which the coil arrangement is pushed toward the narrow end of the funnel so that the last coil along a circular path moves in front of the first coil and their winding head segments lie against each other. The coil arrangement then describes the cone shape. This is then brought into the cylinder shape by simultaneously bringing the coil segments forming the second winding head closer together until all longitudinal segments of the coils are arranged parallel to each other. That can be done inside the forming tool or outside it.

According to another embodiment, the coils are manufactured individually and then encapsulated together, including the winding head. Here all coils can be encapsulated together, producing a one-piece cast body that is axially inserted into the stator assembly. Alternatively, only some of the coils can be encapsulated, for example, all coils belonging to the same phase, producing a multi-part, for example, a three-part cast body. This multi-part cast body can be subsequently assembled and axially inserted into the stator assembly in this assembled form. Thus the coil assembly can also be formed by a multi-part cast body of cast body sections axially inserted into each other, in which all coils of a phase are preferably encapsulated together in each cast body section.

In all of the aforementioned versions, the coils on the part of the winding head or the first winding head respectively have at least the following features:

a first radial segment that connects to a first longitudinal coil segment projecting from a first slot of the stator assembly, one curved segment connected to the first radial segment and extending along an arc to a second slot of the stator assembly, in which a second longitudinal coil segment lies, and a second radial segment that connects the curved segment to the second longitudinal coil segment.

The first radial segment turns the path of the coil from the axial direction coming out of the slot towards the motor axis, into the annular space between the inner diameter and the outer diameter, so that the winding head is not aligned with the stator teeth. The second radial segment turns the path of the coil from this annular space back into alignment with the second slot in order to continue in the axial direction.

The first and/or second radial segment can respectively be part of an S or U-shaped segment.

The curved segment preferably lies on a circle around the stator axis. It can connect to the first radial segment directly or via an intermediate segment. Furthermore, the curved segment can transition into the second radial segment directly or via an intermediate segment.

In one embodiment, the curved segment can extend helically to the stator assembly. In other words, it not only extends along the arc but simultaneously in the axial direction as well. This increases the axial length of the winding head, permitting the winding head to hold a high number of coils, notably a two-layer coil assembly in the slots of the stator.

With the helically curved segment, a coil assembly having a symmetrical winding head can be produced. However, the coils of the coil assembly may be asymmetrical.

For example, the coil assembly may be torpedo-shaped overall.

According to one embodiment, the coils on the part of the winding head or the first winding head respectively may have the following features:

a first curved segment connected to the first radial segment and extending
helically away from the stator assembly along a first arc, and a second curved segment connected to the second radial segment and extending helically toward the stator assembly along a second arc, in which the two arcs lie on different diameters and the curved segments are connected to each other by a connecting segment. In this embodiment, the longitudinal coil segments may be shorter than in a torpedo-shaped version.

The aforementioned versions with a helically curved segment play a role in particular in manufacturing the coil assembly from encapsulated single coils in order to enable nesting the coils inside each other.

For manufacturing the coil assembly as a one-part or multi-part cast body, an advantageous winding concept is obtained by the coils lying in the slots, distributed so that a second coil of a phase lies in a first slot and a second slot diametrically opposite the first slot, and a first and third coil of the phase respectively lie in two slots that lie in the same circumferential semi-circle relative to the second coil. This results in a minimal length of the winding head segments of the second and third coils in the winding head or the first winding head.

To obtain a symmetrical winding head, the second coil can consist of two coil sections or, at least in the winding head, divide into two coil sections that, in the winding head, extend in opposite circumferential directions from the first slot to the second slot. The two coil sections preferably have the same number of windings, notably half the number of windings of the two other coils. They are connected in series, preferably wound continuously with the same winding wire, so that the second coil has the same number of windings in total as the first and third coils.

The motor is preferably a three-phase motor. Alternatively it can be a five-phase motor.

Furthermore, the motor is preferably a two-pole motor. However, it may also be a four-pole or even an eight-pole motor.

Each phase preferably has three coils, but four or more coils per phase may be present as well.

The coils of the same phase are connected in parallel or series to form a coil group. The coil groups can be connected, for example, in a star or delta formation.

The coils can lie in the slots in one or two layers.

Overall a three-phase motor with three coils per phase thus has nine coils, so that the stator of such a motor has eighteen slots given a single-layer arrangement of the coils. In case of a two-layer arrangement, the stator only has nine slots since the longitudinal segments of two coils are arranged in each slot.

The number of windings of the coils can be chosen arbitrarily depending on the slot cross-section, for example, between 20 and 80, preferably between 40 and 60, and in particular can preferably be 50.

As previously described, the coil assembly according to a first version can be manufactured by respectively winding and encapsulating the coils individually and subsequently nesting them inside each other to form the coil assembly.

According to a second version, the coil assembly can be manufactured by inserting the coils into a tool comprising a cylindrical winding support having a rear winding support segment and a front winding support segment, in which a number of fins corresponding to the stator teeth is mounted on the outer circumference of the rear winding support segment and there is a longitudinal cavity respectively between two fins adjacent to each other in the circumferential direction, and the front winding support segment is radially offset compared to the rear winding support segment, forming an annular space between the front winding support segment and the fins that is open towards an insertion end, in which the coils are inserted into the longitudinal cavities so that a winding head segment of a coil forming part of the winding head lies in the annular space and the coils are encapsulated in the tool. Thus the tool simultaneously brings the coils into the desired shape in addition to encapsulating them.

The coils can be inserted into the tool by winding the respective coils individually and inserting them into the tool 20 as wire bundles. In other words, the coils are wound to form the wire bundles outside the tool. Since the coils are shaped in the tool, the wire bundles can be wound in an annular shape, for example, an O-shape.

Alternatively, the tool can serve as the winding tool. In this case, the coils are wound sequentially using a needle winding device, forming wire bundles directly in the tool. The tool and the needle winding device are moved relative to each other to sequentially lay the windings of a coil. The needle winding device supplies the electrical conductor or winding wire, respectively the round wire, and lays it in the prescribed coil shape.

In both aforementioned cases, a wire bundle of a coil can be inserted into the tool so that it extends radially through a first of the longitudinal cavities into the annular space, extends in a curve to a second longitudinal cavity and emerges from it again radially. Thus the winding head is offset radially to the stator axis relative to the stator slots. It therefore extends only between an inner diameter and an outer diameter that is smaller than the diameter of the stator bore.

The curved segment preferably lies on a circle around the tool axis.

When a coil is wound directly in the tool, this can be done as described below. The needle winding device can be moved in a first movement, notably parallel to the longitudinal axis of the tool, along a first longitudinal cavity across the rear winding support segment in the direction of the insertion end, until the needle winding device emerges axially from the first longitudinal cavity. Subsequently, the needle winding device is moved in a second movement radially to the longitudinal axis of the tool so that the winding wire gets out of alignment with the longitudinal cavity. In a third movement, the winding support is now rotated relative to the needle winding device around the longitudinal axis of the tool in a circumferential direction until the winding wire lies axially in front of a second longitudinal cavity, i.e. on the same peripheral angle as the second longitudinal cavity. In a fourth movement, the needle winding device is subsequently moved radially away from the longitudinal axis of the tool into alignment with the second longitudinal cavity. Subsequently, it is moved in a fifth movement along the second longitudinal cavity across the rear winding support segment, notably parallel to the longitudinal axis, in the direction of the second axial end opposite the insertion end, until the needle winding device emerges axially from the second longitudinal cavity. In a sixth movement, the winding support is now rotated relative to the needle winding device, back around the longitudinal axis of the tool opposite to the circumferential direction, until the winding wire lies axially in front of the first longitudinal cavity, i.e. on the same peripheral angle as the first longitudinal cavity. This completes the laying of a first winding.

The first through sixth movements are subsequently repeated to produce the remaining windings of the coil. The windings continuously merge into each other.

Naturally, the respective other component, i.e. the tool and needle winding device, can also be moved for the aforementioned movements, or both components can even be moved simultaneously.

Due to the radial relative movement between the needle winding device and the tool at the insertion end, the winding head is formed radially offset to the longitudinal axis of the motor relative to the stator slots. Since such a radial relative movement is lacking at the second axial end, the second winding head opposite the first winding head is formed there, axially before radially at the same level as the stator slots.

The aforementioned second and fourth movements can be omitted if required, notably if the second longitudinal cavity is diametrically opposite the first longitudinal cavity, at least substantially, i.e. the first and second longitudinal cavities lie in opposite angle segments. In this case, the third movement (rotation movement) already causes the winding wire to run radially inward and the fifth movement (linear movement) causes it to run radially outward again from there.

If the wire bundle is not wound inside the tool but produced outside the tool and inserted into the same, the wire bundle can be pressed in the annular space using a first cylindrical heading tool guided on the front winding support segment in the direction of the rear winding support segment, so as to form the winding head segment of the coil that forms part of the winding head. Thus this takes place in the annular space.

Subsequently, the wire bundle can be pressed using a second cylindrical heading tool guided on the outside of the fins to the axial end of the winding support opposite to the insertion end, so that it wraps around the fins with increasing tension on the outer circumference to form a second winding head segment of the coil that forms part of a second winding head.

Inserting the wire bundle into the tool, pressing it using the first heading tool and subsequently using the second heading tool can be carried out sequentially for the remaining coils, one by one. Alternatively, the wire bundles for several or all coils can be inserted into the tool directly. Pressing using the first and second heading tools is then performed simultaneously for these several or even all coils.

After the coils are inserted into the tool, it can be completed to form a casting mould. In case the wire bundles are produced outside the tool, the heading tools are first removed from the tool.

Then a first sleeve that radially seals the longitudinal cavities can be put over the fins and a second sleeve that radially delimits a second winding head can be positioned around it, so that the first and second sleeves form delimiters of a casting mould that contains the coils and in which they are encapsulated.

For example, the second sleeve can be put over the first sleeve, notably so that the second sleeve encompasses the outside of the first sleeve.

Furthermore, a cover that axially delimits the second winding head can be provided to close the face end of the second sleeve.

After positioning the sleeves and where applicable the cover, the coils can be encapsulated inside the tool.

For the second embodiment, a tool for manufacturing a coil assembly of distributed windings for axial insertion into a stator assembly of an electric motor is proposed, having slots that are radially open to the inside, respectively separated from each other by a stator tooth, comprising a cylindrical winding support with a number of fins corresponding to the stator teeth mounted on its outer circumference, in which there is a longitudinal cavity respectively between two fins adjacent to each other in the circumferential direction and the winding support has a rear winding support segment and a front winding support segment that is radially offset compared to the rear winding support segment, forming an annular space between the front winding support segment and the fins, which is open towards an insertion end in the axial direction. This tool can be used to hold and shape a wire bundle of a coil, and for winding a coil directly in the tool.

The tool can comprise a first cylindrical heading tool, lying in the annular space so it is axially moveable and guided on the front winding support segment to press the coil in the direction of the rear winding support segment, forming the segment of the coil lying in the winding head or first winding head.

In addition or alternatively, the tool can comprise a second cylindrical heading tool, guided on the fins so it is axially moveable in order to press the coil radially into the first and second longitudinal cavities and to the second axial end of the winding support that is opposite to the insertion end.

To convert the tool into a casting mould, a first sleeve that radially seals the longitudinal cavity, which can slide onto the fins, and a second sleeve that radially delimits an annular space axially opposite to the insertion end for a second winding head of the coil can be provided, so that the first and second sleeves form delimiters of a casting mould in which the coils are encapsulated. Where applicable, a cover axially delimiting the annular space can also be provided that can be mounted on the axial face end of the second sleeve.

According to a third version, the coil assembly can be manufactured by respectively winding the coils individually, drawing them into a tool as wire bundles and encapsulating them inside the tool, which comprises a winding support having a central guide cylinder and fins arranged at a distance from it, corresponding in number to the stator teeth, so that an annular space is formed between the guide cylinder and the fins, which is open in the axial direction towards an insertion end, in which there is a longitudinal cavity respectively between two fins adjacent to each other in the circumferential direction. Here the intent is that a. a coil is inserted from the insertion end into the annular space so that it extends radially through a first of the longitudinal cavities into the annular space, extends in a curve to a second longitudinal cavity and emerges from it again radially, b. the coil is subsequently pushed away from the insertion end towards the opposite axial end by a heading tool in the form of a hollow cylinder guided on the guide cylinder, where it forms the winding head segment of the coil lying in the winding head, c. subsequently, a drawing device is moved from the second axial end radially outside along the fins to the insertion end in order to fold up the coil and press it into the first and second longitudinal cavities until the insertion end is reached, where it wraps around the outer circumference of the fins with increasing tension, forming a second winding head segment of the coil that forms part of the second winding head.

Once again, the curved segment preferably lies on a circle around the tool axis.

Steps a. through c. can be performed sequentially for the remaining coils. Alternatively, step a. can be repeated directly for several or even all coils, and steps b. and c. can be subsequently performed for all coils simultaneously.

After drawing in and folding up the coils, a sleeve can be put axially over the fins, sliding to the insertion end starting from the second axial end, radially delimiting the second winding head in an end position in order to form a casting mould for the same.

Subsequently or simultaneously, a locking mechanism with a number of locking rods corresponding to the number of longitudinal cavities can be inserted into the longitudinal cavities, preferably axially, in order to close them to form a casting mould.

A locking ring of the locking mechanism can jointly push the locking rods radially into the longitudinal cavities in order to close them. For this purpose, the locking ring can surround the locking rods along an outer circumference. To exert a consistent radial compressive force on the locking rods, a means to reduce the diameter of the locking ring can be provided. The locking mechanism can also comprise two or more locking rings arranged at intervals from each other at different axial heights of the tool.

After the longitudinal cavities are closed, the coils can be encapsulated in the tool.

Preferably the guide cylinder can have a rotatable eccentric cone at the insertion end. The eccentric cone has a shell surface that is steeper on one side than on the opposite side. For insertion of the coil into the winding support, the eccentric cone can be rotated to a position where the less steep side of the eccentric cone faces the desired curved course of the coil in the annular space from the first to the second longitudinal cavity. This generally facilitates the insertion of the coil from above into the annular space and shaping the curved segment of the coil. The coil slides along the eccentric cone into the annular space.

In particular, the eccentric cone facilitates the insertion and shaping of the curved segment of a coil or coil section that, according to the present invention, is to be arranged in two diametrically opposite longitudinal cavities, because the tip of the eccentric cone is offset relative to a diameter at the insertion end on which the two longitudinal cavities lie. If the head of the guide cylinder were a cone, its tip would lie on the diameter, so that an additional measure would be required to bring the coil onto the right or left side of the cone. If the curved segment of the coil or coil section is to extend along the left semicircle in reference to the aforementioned diameter, the eccentric cone can be rotated to a position where its tip is offset to the right relative to the diameter. Consequently the less steep side of the eccentric cone then faces to the left. If the curved segment of the coil or coil section is to extend along the right semicircle in reference to the aforementioned diameter, the eccentric cone can be rotated to a position where its tip is offset to the left relative to the diameter. Consequently the less steep side of the eccentric cone then faces to the right.

For the purpose of automation, it is advantageous for the coil to be wound as a wire bundle above the insertion end using a flyer winder and then dropped into the winding support. This is done so that the coil falls into the aforementioned first and second longitudinal cavities at the insertion end. The section between the first and second longitudinal cavities on the other hand falls onto the eccentric cone and slides down its less steep side into the annular space.

To execute the method according to the third version, a tool for manufacturing a coil assembly of distributed windings for axial insertion into a stator assembly of an electric motor is proposed, having slots that are radially open to the inside, respectively separated from each other by a stator tooth, comprising a winding support having a central guide cylinder and fins arranged at a distance from it, corresponding in number to the stator teeth, so that an annular space is formed between the guide cylinder and the fins, which is open in the axial direction towards an insertion end to hold at least one coil wound in the form of a wire bundle, in which there is a longitudinal cavity respectively between two fins adjacent to each other in the circumferential direction.

The tool can have a heading tool in the form of a hollow cylinder that can be inserted into the annular space and is guided on the guide cylinder, in order to push the coil(s) to the second axial end opposite the insertion end, and to there form a first winding head segment of the coil(s) forming part of a first winding head of the coil assembly.

The tool can have a drawing device that is movable to the insertion end, sliding radially along the outside of the fins, in order to fold up the coil(s). In this process, the coil is also pressed to a minor extent into the first and second longitudinal cavities.

Ideally the drawing device has a drawing cone that can preferably be hyperbolic viewed in the axial cross-section. During the movement of the drawing cone to the insertion end, the section of the coil(s) lying outside the fins slides along the inside of the drawing cone, aligning the coil parallel to the first and second longitudinal cavities. Preferably the hyperbolic section of the drawing cone transitions to a cylindrical section that is in contact with the outside of the fins. This causes the coil(s) or more precisely the longitudinal segment of the coil(s) to be pressed into the first and second longitudinal cavities.

The tool can have a sleeve that can be put over the outside of the fins, sliding toward the insertion end to an end position, in order to encompass a second winding head segment of the coil(s) forming part of a second winding head in this position, forming a casting mould.

Furthermore, the tool can have a locking mechanism with a number of locking rods corresponding to the number of longitudinal cavities, that can in particular be inserted axially into the longitudinal cavities in order to close them, forming a casting mould.

The locking mechanism can have at least one locking ring in order to jointly push the locking rods radially into the longitudinal cavities.

Preferably the guide cylinder at the insertion end can have a rotatable eccentric cone with a shell surface that is steeper on one side than on the opposite side. As described above, this facilitates receiving a coil at the insertion end, or more precisely the positioning of its winding head segment in the annular space.

According to an advantageous embodiment, the drawing device can include a press ring actuating element that can slide along the winding support to the insertion end, having a number of sliding dies in an annular arrangement corresponding to the number of longitudinal cavities, so that each sliding die projects into one of the longitudinal cavities in order to press the coil(s) radially into the first and second longitudinal cavities. The press ring actuating element is preferably arranged below the drawing cone and ideally can be moved to the insertion end together with it.

In the process, each sliding die can support itself on a shock resistant block, relative to which it is radially moveable, in which the sliding dies can be pushed into the shock resistant blocks against a restoring force. The shock resistant blocks push the sliding dies radially toward the tool axis, thereby exerting the force required to press the coil(s) into the longitudinal cavities.

Additional characteristics, advantages and properties of the invention are described in more detail below with the help of embodiments of the invention and the included figures. Identical reference numbers or reference marks in the figures identify components, parts, surfaces or directions that are identical or at least have the equivalent effect.

Please note that the terms "have", "comprise" or "contain" in no way exclude the existence of additional characteristics within the scope of the present description. Furthermore, the use of the indefinite article for an object does not exclude its plural.

The terms or word elements "radial", "axial", "circumferential" or "in circumferential direction" used in the present description generally refer to the longitudinal axis of the stator or the tool, unless otherwise specified.

Characteristics of an embodiment of the invention may also exist in another embodiment unless this is technically excluded. Furthermore, process features described for one of the fixtures and fixture characteristics described here may exist in the method described here.

LIST OF FIGURES

FIG. 1: Cross-section of a stator assembly of an electric motor according to the state of the art FIG. 1*a*: Illustration of the assignment of the slots of the stator assembly to the phases FIG. 1*b*: Schematic view of the electric motor in an exploded view FIG. 1*c*: Schematic view of a coil winding pattern according to the present invention FIG. 2: Perspective view of a two-layer coil assembly according to the present invention made of encapsulated single coils with a view of the shaped first winding head FIG. 3*a*-3*c*: Various views of a single coil of the coil assembly according to FIG. 2

FIG. 4: Perspective view of a two-layer coil assembly according to the present invention made of encapsulated single coils FIG. 5*a*-5*b*: Two different views of a single coil of the coil assembly according to FIG. 4

Figures 6A, 6B:
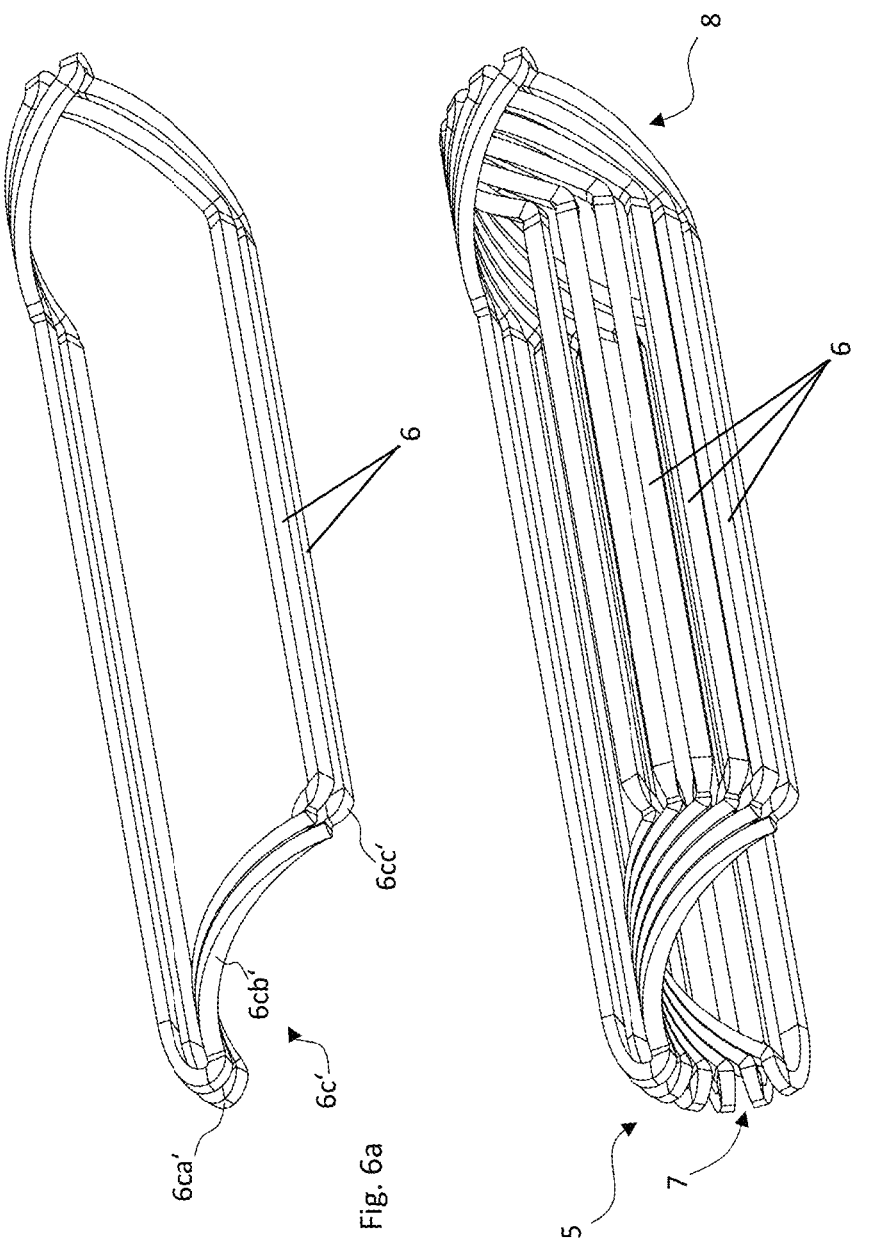

FIG. 6*a*-6*b*: Snapshots during the joining of single coils according to FIG. 5*a*, 5*b* to make the coil assembly according to FIG. 4

FIG. 7*a*-7*d*: Snapshots during the axial joining of the stator assembly and coil assembly according to FIG. 4

Figures 8A, 8B, 8C:
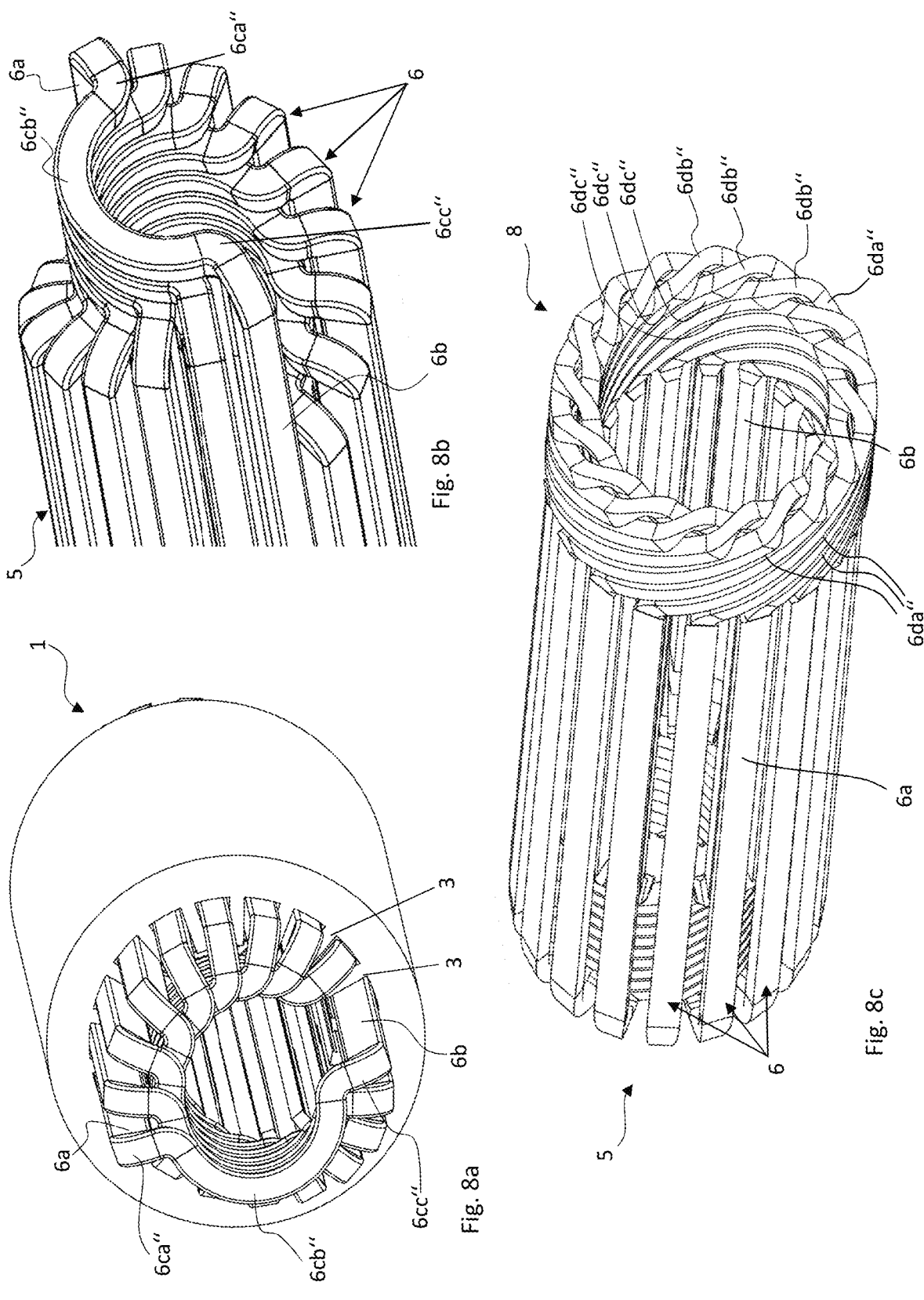
Figures 9A, 9B, 9C:
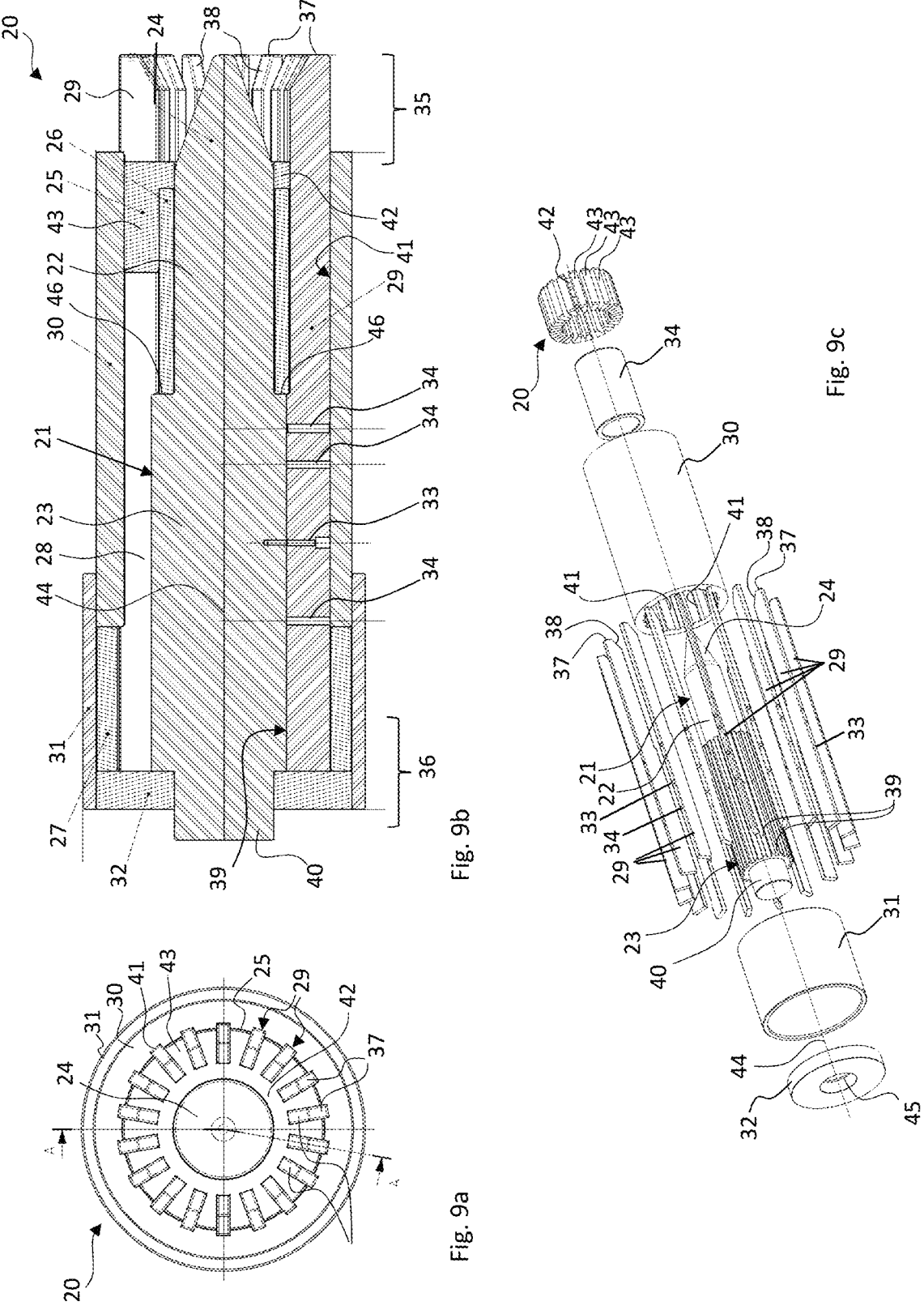

FIG. 8*a*-8*c*: Various perspective views of a one-layer coil assembly according to the present invention made of encapsulated single coils according to an additional embodiment FIG. 9*a*-9*c*: A tool for drawing in and encapsulating coils in a radial cross-section (FIG. 9*a*), an axial cross-section (FIG. 9*b*) along the section boundary A-A according to FIG. 9*a* and in an exploded view (FIG. 9*c*)

Figure 10B:
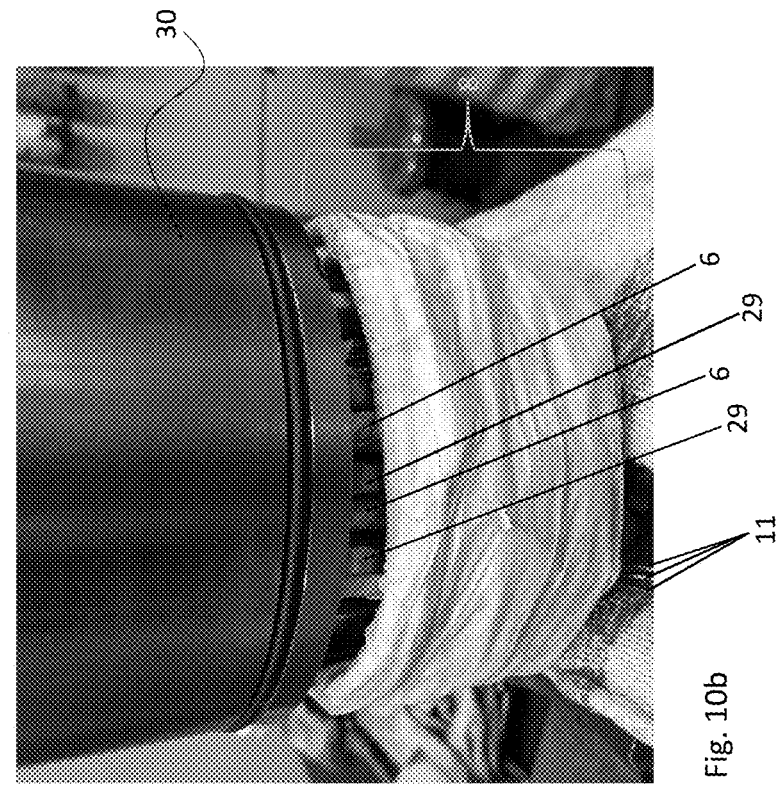
Figure 10A:
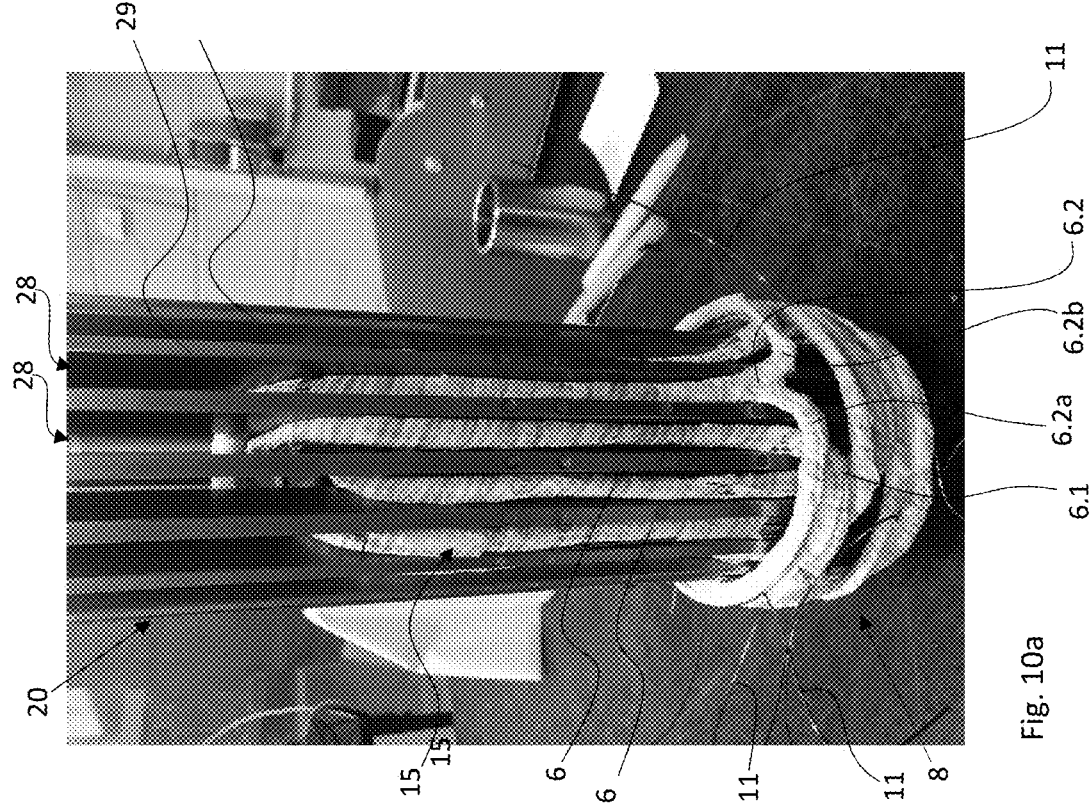
Figure 11B:
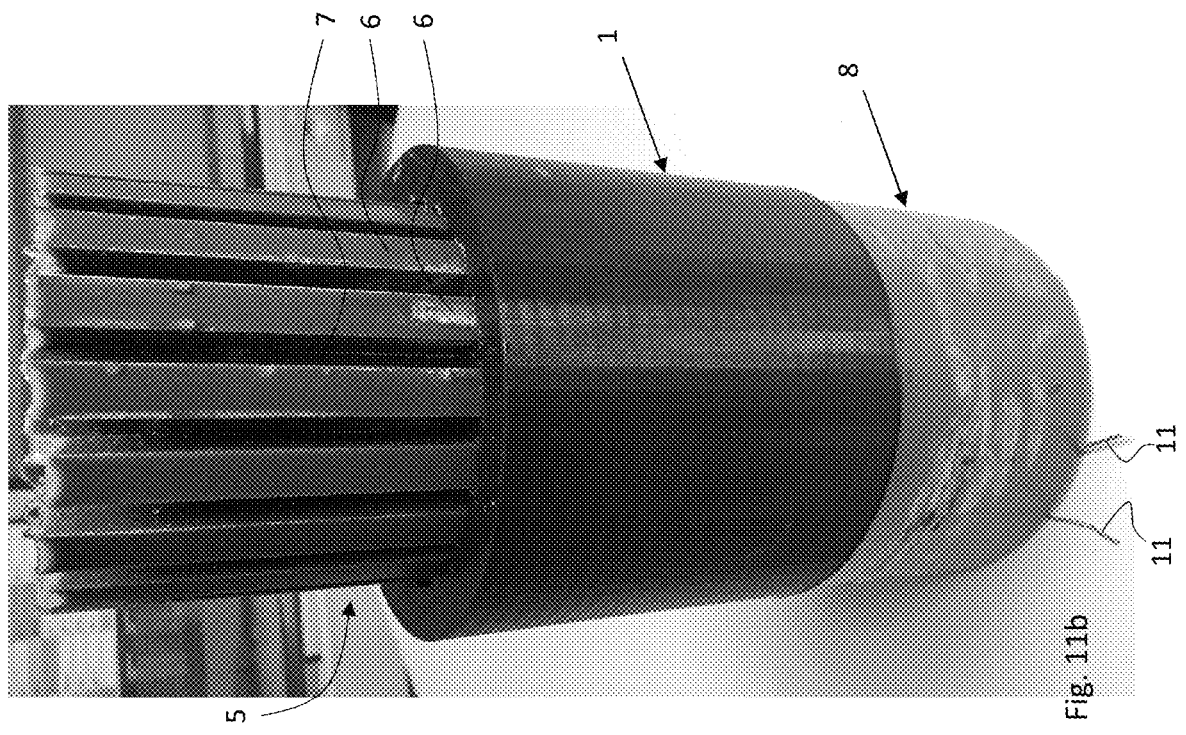
Figure 11A:
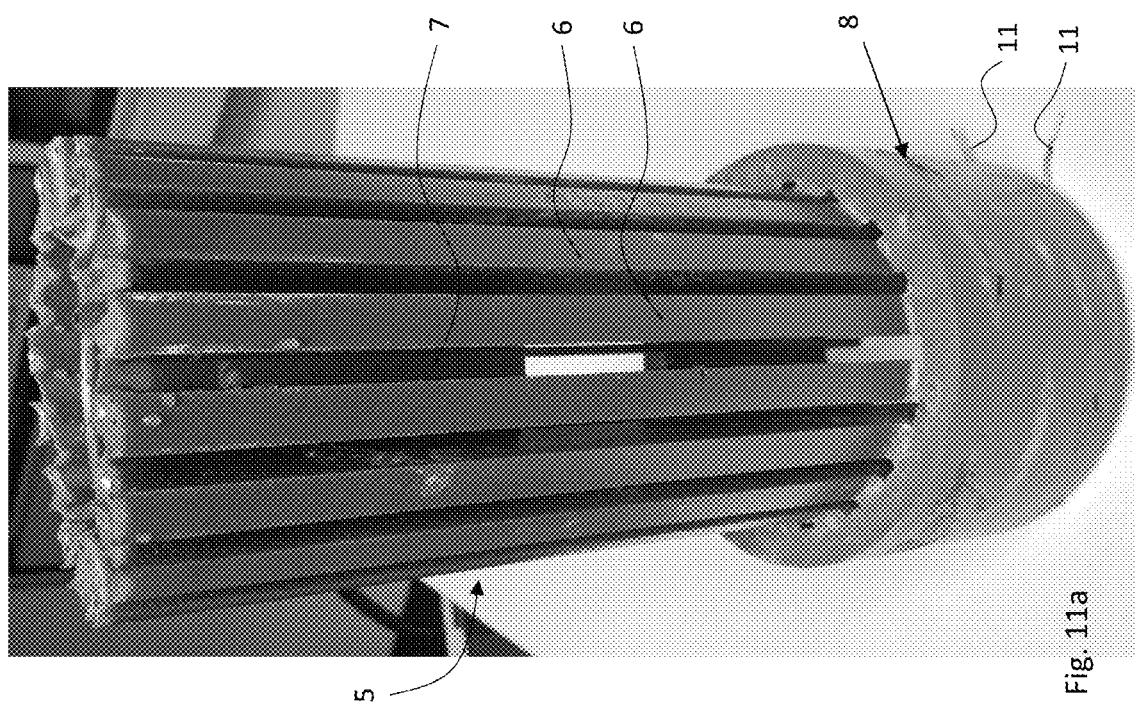

FIG. 10*a*: View of a test tool according to FIG. 9*a-c* with coils drawn in FIG. 10*b*: View of the test tool according to FIG. 9*a-c* with the first sleeve in place FIG. 11*a*-1*b*: Views of the coil assembly as a cast body before (FIG. 11*a*) and after axially sliding on the stator (FIG. 11*b*)

Figures 11C, 11D:
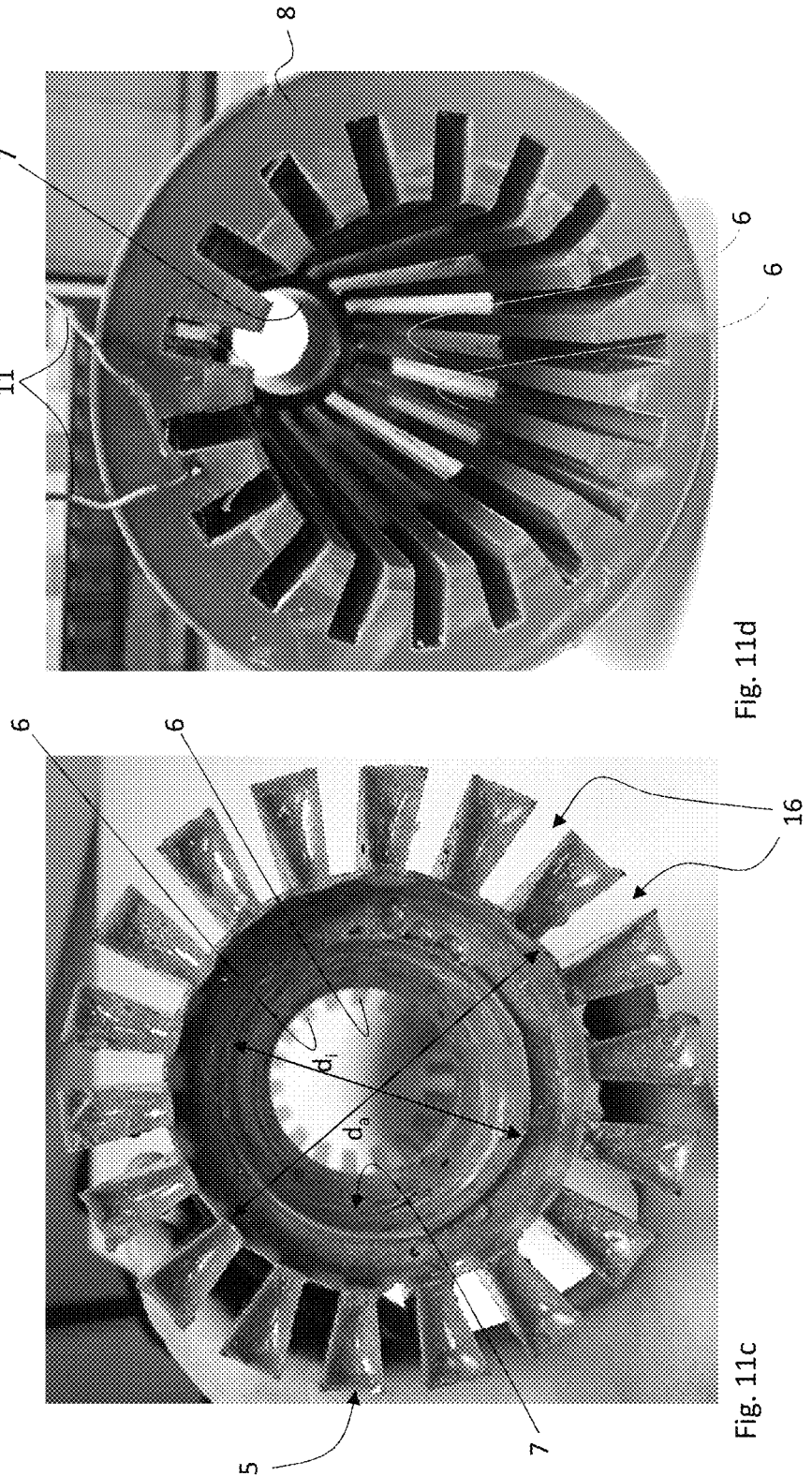

FIG. 11*c*-11*d*: Views of the cast body according to FIG. 11*a* with view of the radially inner first winding head (FIG. 11*c*) and radially outer second winding head (FIG. 11*d*)

FIG. 12*a*-12*f*: Various snapshots of a tool during execution of the method according to the present invention for manufacturing the stator assembly by drawing in and folding over the coils FIG. 13*a*-13*b*: Longitudinal sections through the tool for drawing in and folding over the coils at the point in time shown in FIG. 12*d* (FIG. 13*a*) and the point in time shown in FIG. 12*f* (FIG. 13*b*)

Figure 12C:
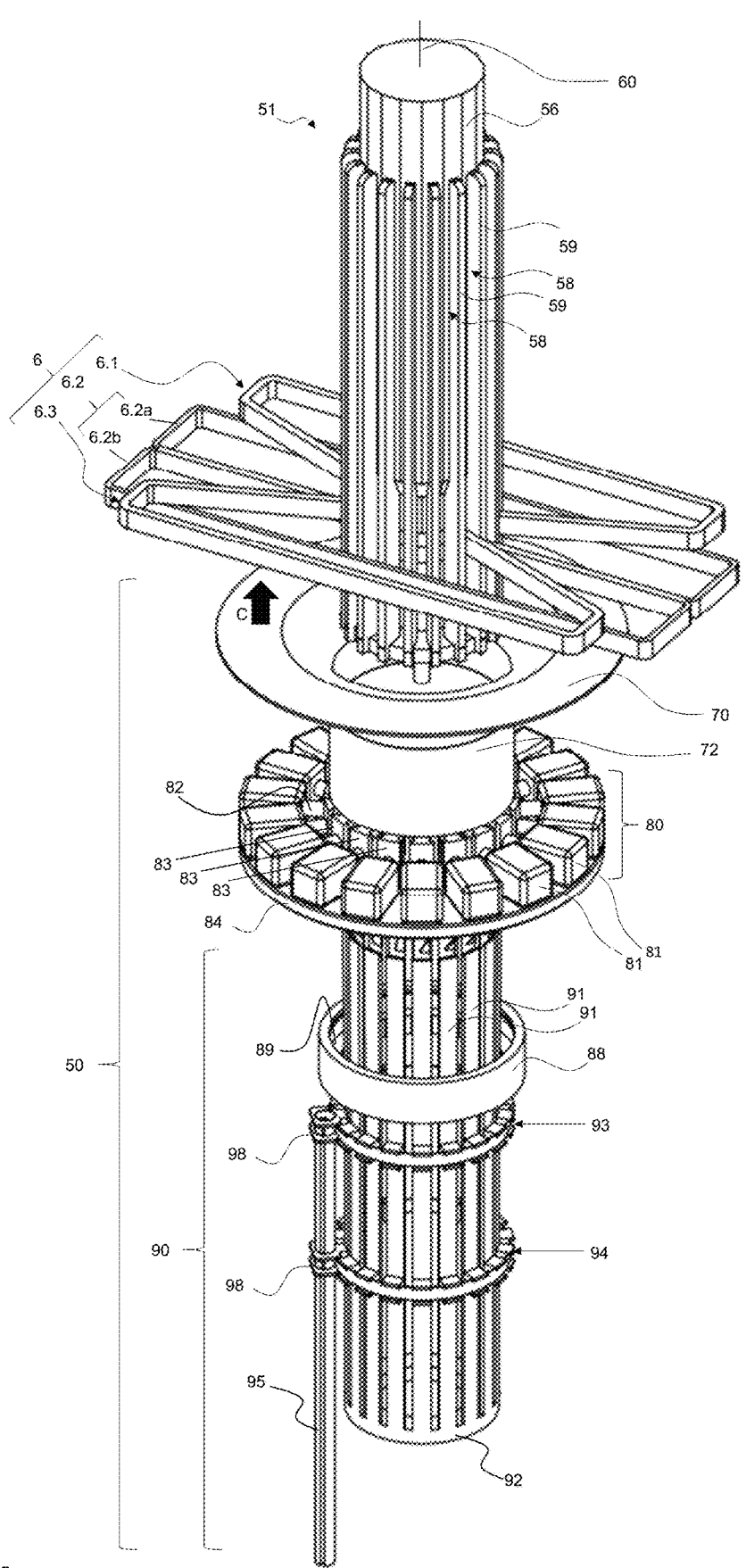
Figure 13A:
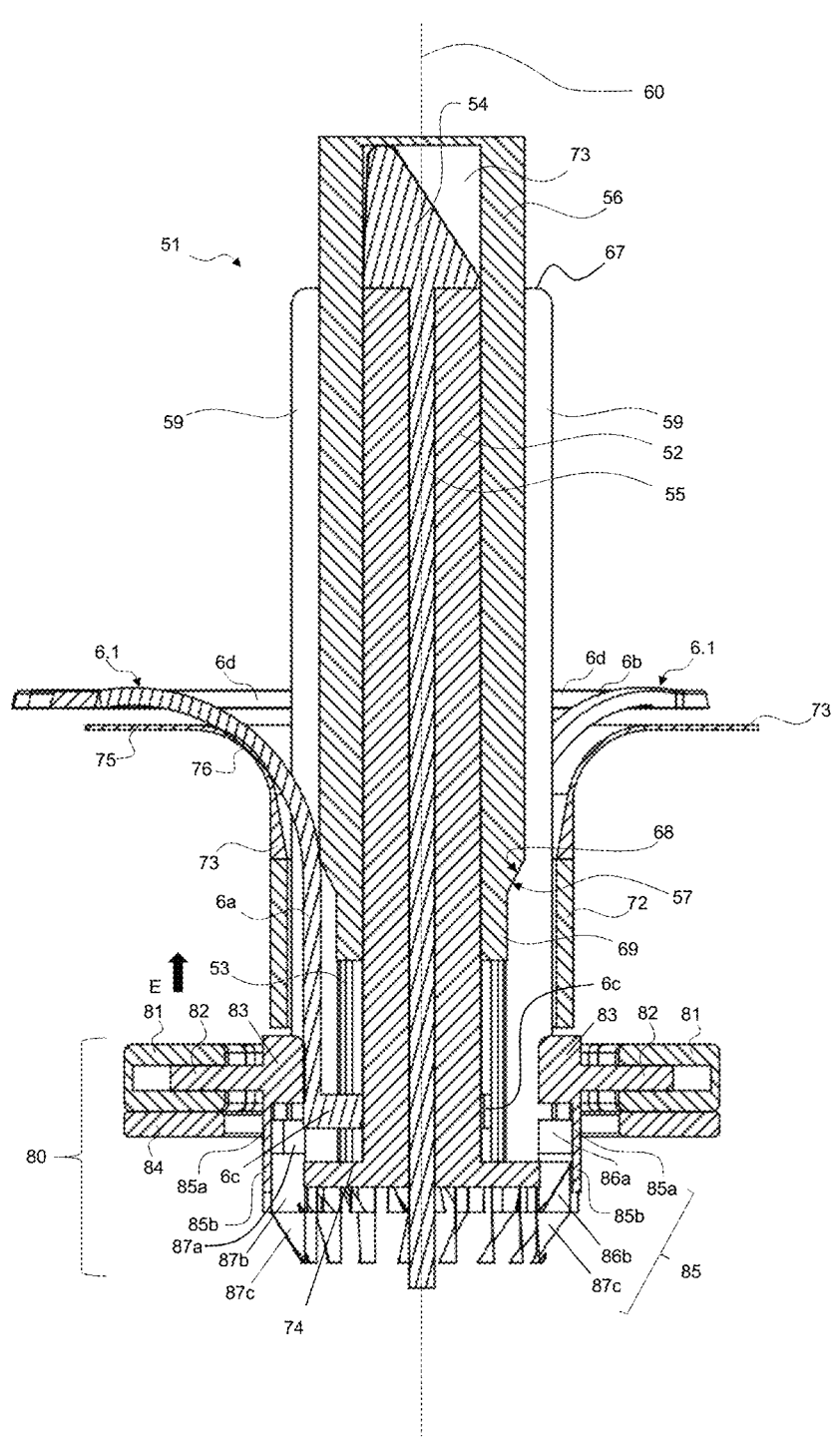
Figures 13C, 13D:
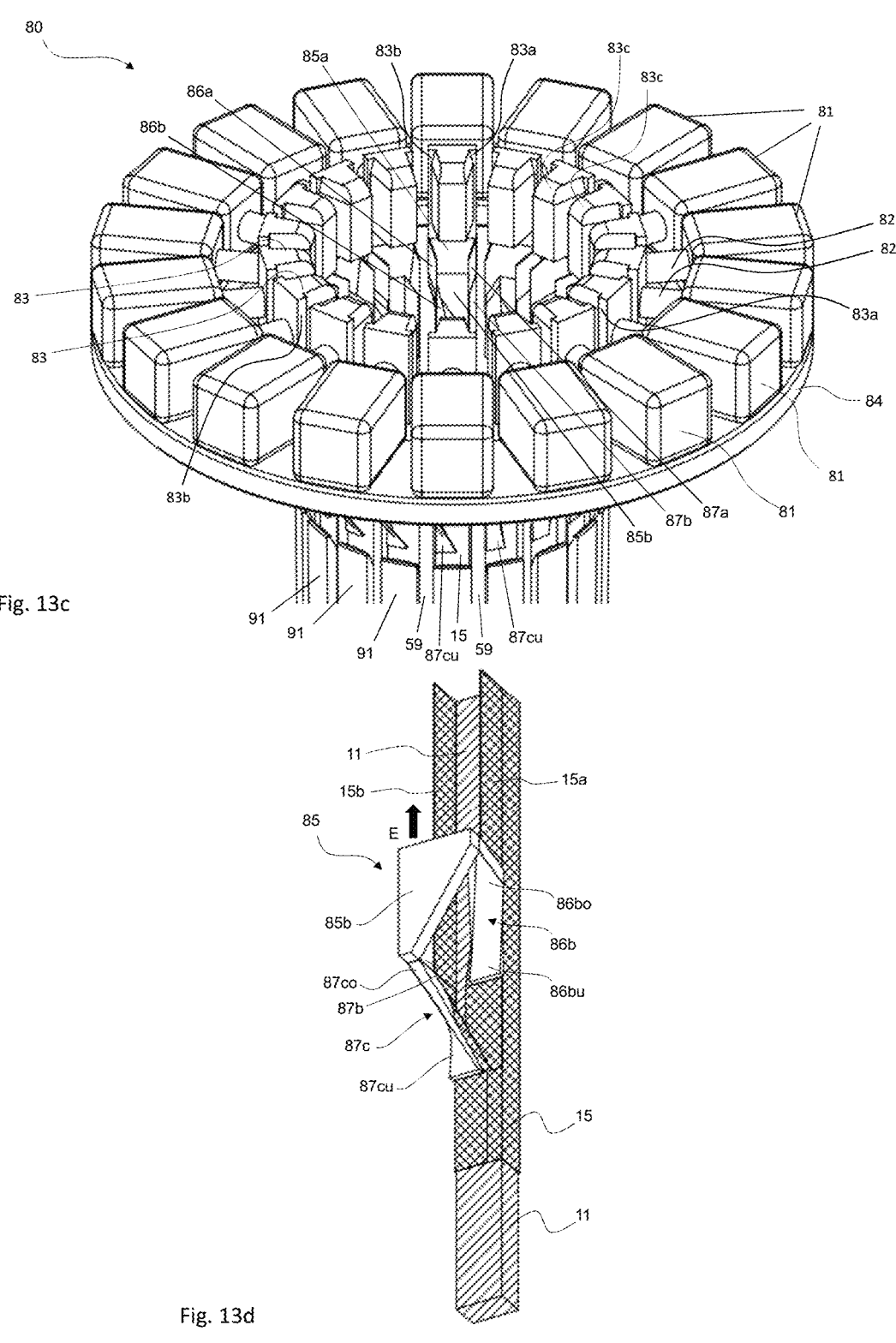

FIG. 13*c*: Perspective view of the press ring actuating element from FIG. 12*c*

FIG. 13*d*: Individual depiction of a guiding and folding element arrangement of the press ring actuating element from FIG. 12*c*

Figure 13E:
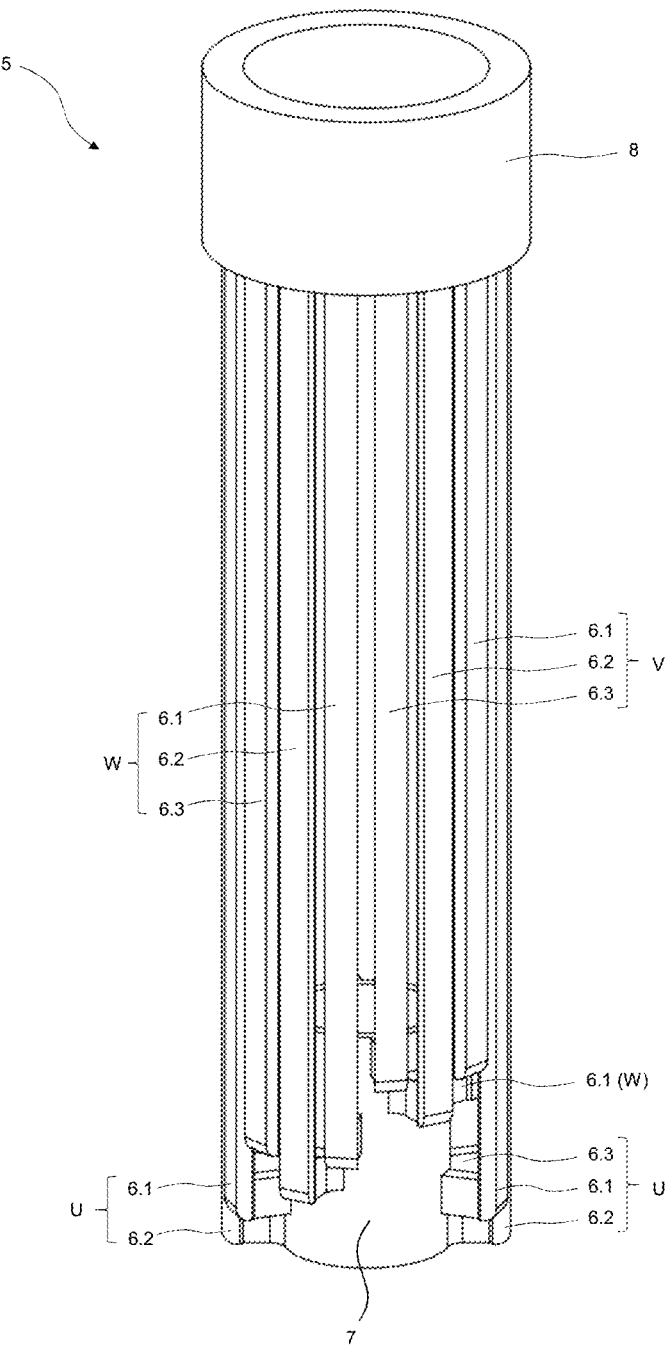

FIG. 13*e*: Encapsulated coil assembly manufactured according to the present invention by drawing in and folding over using the tool in FIG. 12*c*

Figure 13F:
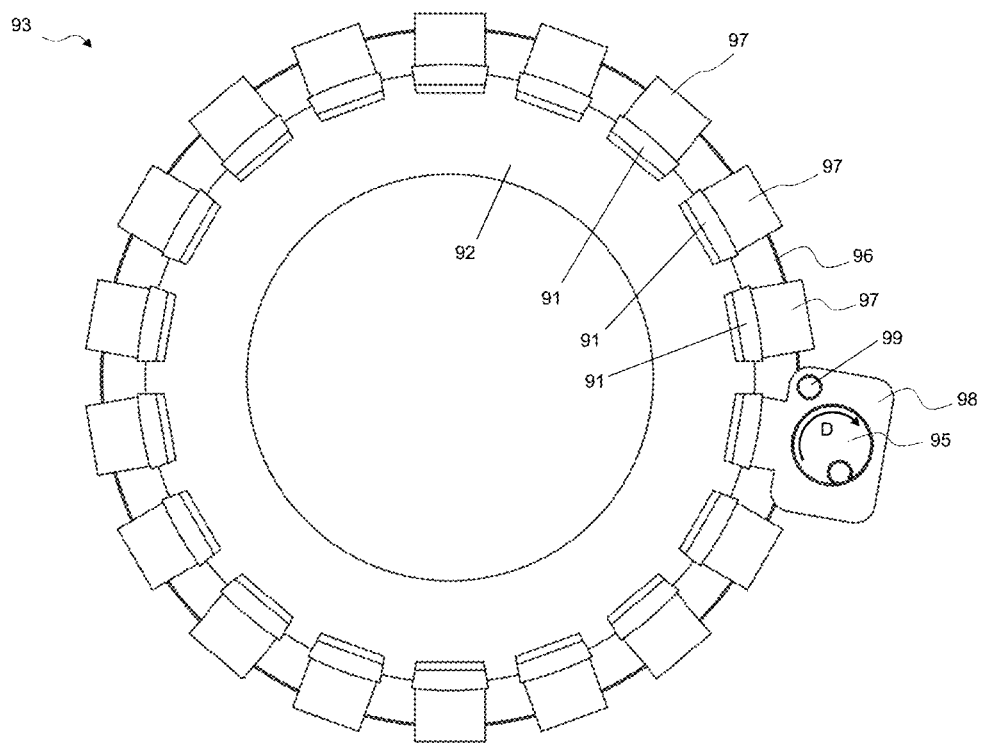

FIG. 13*f*: Top view of the locking mechanism of the tool in FIG. 12*c*

Figure 13G:
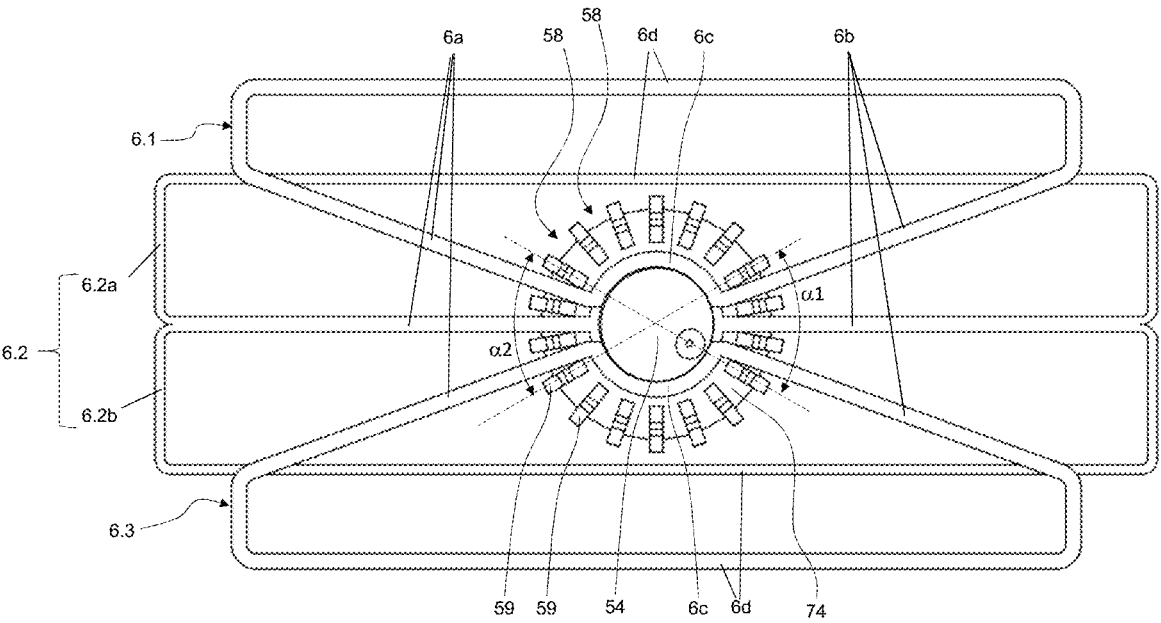
Figures 4C, 14A, 14B:
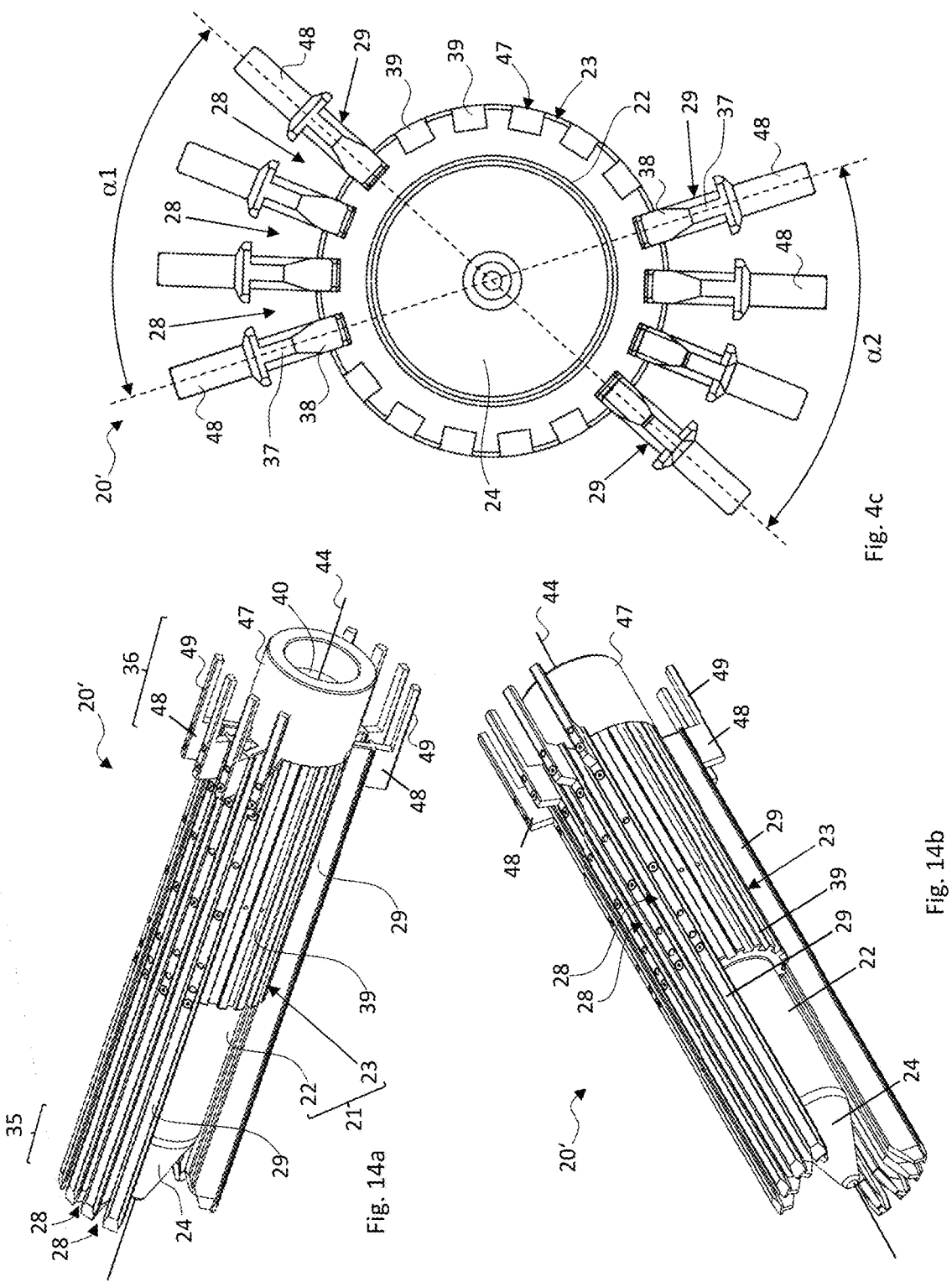

FIG. 13*g*: Top view of the tool in FIG. 12*c* with three coils of a phase FIG. 14*a*-14*c*: Tool for needle winding and encapsulating the coils of a single phase in a first (FIG. 14*a*) and second (FIG. 14*b*) perspective view and in a top view (FIG. 14*c*)

Figures 14D, 14E:
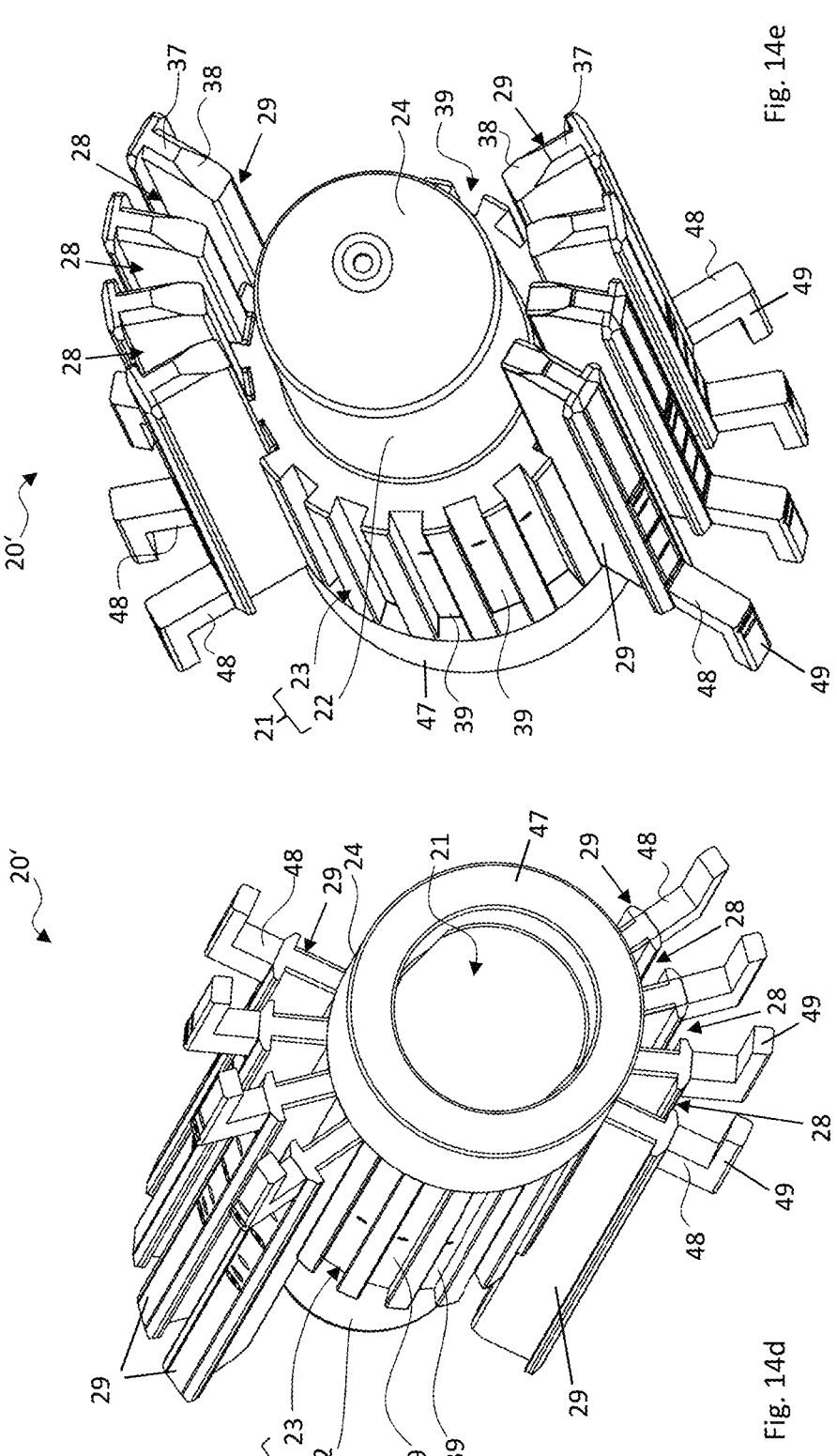

FIG. 14*d*-14*e*: Enlarged views of the axial ends of the tool according to FIG. 14*a*-14*c*

Figures 15A, 15B, 15C:
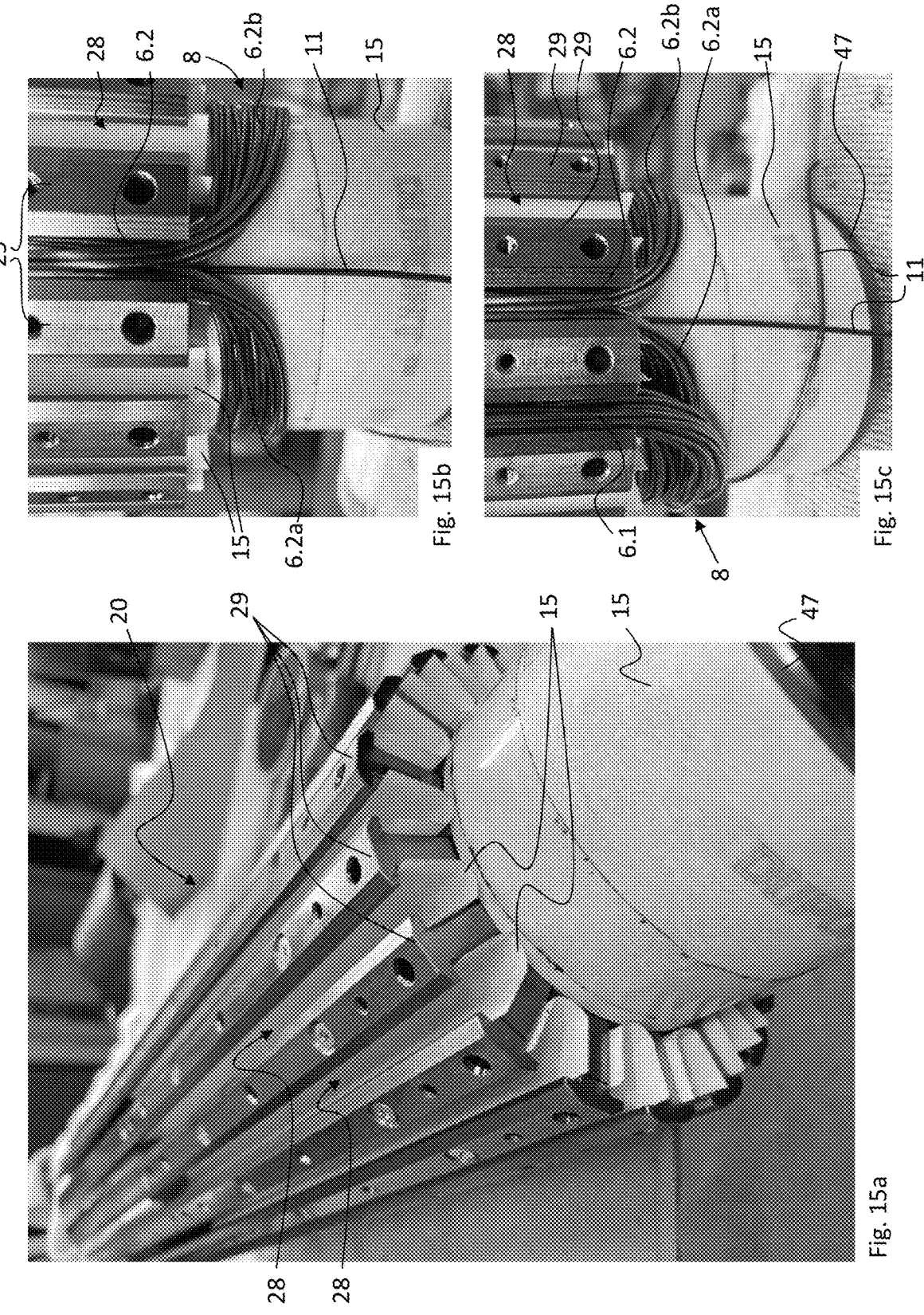

FIG. 15*a*: Perspective view of the tool for needle winding and encapsulating the coils with insulated longitudinal cavities FIG. 15*b*-15*c*: Views of the tool according to FIG. 15*a* with a view of the interconnected second winding head with a first coil drawn in (FIG. 15*b*) and two coils drawn in (FIG. 15*c*).

Embodiments of the invention for the composition of an electric motor for a deep well vertical turbine pump according to the present invention are described below. The electric motor has a stator made of a mechanical stator assembly 1 and an electric coil assembly 5. The stator assembly 1 has a stator bore 9 with a diameter $D_b$ to receive a rotor 13 mounted on a motor shaft 14 and slots 4 that are open radially to the inside, more precisely towards the stator bore 9, delimited in the circumferential direction on both sides by respectively one stator tooth 3, so that the stator teeth 3 and the stator slots 4 alternate along the inner circumference of the stator assembly 1. One such stator assembly 1 is shown in FIG. 1 and is commonly known. It consists of a number of plates insulated against each other in the axial direction. The stator teeth 3 transition to a stator ring 2. The stator teeth 3 can be of one piece with the stator ring 2 or attached to it, for example, with positive locking such as a dovetail joint. Merely by way of example, the stator assembly 1 in FIG. 1 has eighteen slots 4; however, the number of slots 4 may be higher or lower.

For the composition of the electric motor as an induction motor, in the simplest case a three-phase motor supplied by three phases U, V, W, the electric motor has a coil assembly 5 with coils 6 made of electrical conductors 11 formed by what are called distributed windings. In a distributed winding, the corresponding coil 6 of a phase U, respectively its electrical conductor 11, extends within a first slot 4a and a second slot 4b, separated from each other by several stator teeth 3, so that additional slots 3 lie between the first and second slots 4a, 4b in which the coils 6 of other phases V, W are arranged. In case of a two-pole electric motor, the first slot 4a and second slot 4b lie opposite each in the simplest case or are at least arranged within opposite angle segments $\alpha1$, $\alpha2$ of the stator circumference assigned to the same phase U, V, W; see FIG. 1a. In case of a four-pole electric motor, these angle segments are offset relative to each other by 90°.

FIG. 1a shows the assignment of the coils 6 to the phases U, V, W and slots for a two-pole motor. A number X/2 of coils 6 are arranged in the X slots 4, i.e. there are nine coils 6 in the present example with X=18 slots. Respectively three of these coils are assigned to a phase U, V, W, connected in parallel and thus forming a group. The groups are electrically interconnected, for example, in a star or delta formation. Each group or phase U, V, W is distributed over two opposite angle segments $\alpha1$, $\alpha2$.

The stator assembly 1 has a first axial end and a second axial end. It can have a length between 30 cm and 1.50 m. In the embodiments shown here, the coils 6 respectively form a winding head 7, 8 on the two axial ends of the stator assembly 1 respectively the coil assembly 5 in order to transition from the first slot 4a to the second slot 4b. Thus a winding head 7, 8 is formed by the coil segments 6c, 6d of different coils 6 at an axial end of the coil assembly 5 lying against each other, or more precisely lying over each other axially at least in part.

The central idea according to the present invention is to form the coil assembly 5 from encapsulated single coils or as a cast body with coils embedded in it, however in a manner independent of the stator assembly 1 as opposed to the state of the art. Thus the coil assembly, i.e. the electrical part of the stator, is manufactured outside the stator assembly. Subsequently the coil assembly 5 is axially inserted into the slots 4 of the stator assembly 1. In order to accomplish this, the intent according to the present invention is for a first of the two winding heads 7, also called the shaped winding head 7 in the following, to extend only between an inner diameter $d_i$ and an outer diameter $d_a$, in which the outer diameter $d_a$ is smaller than the diameter $D_b$ of the stator bore 9. Thus the shaped winding head 7 is offset radially to the inside towards the motor axis 10 relative to the stator teeth 3, creating the clearance required to slide the stator teeth 3 between the encapsulated coils 6 during axial joining, as illustrated in FIG. 1b and described in more detail below.

Accordingly the method according to the present invention for manufacturing an electric motor according to the present invention comprises the steps:

providing a stator assembly 1 that has a stator bore 9 to hold a rotor and slots 4 that are radially open to the inside, respectively separated from each other by a stator tooth 3, manufacturing a coil assembly 5 of encapsulated coils 6 or by encapsulating coils made by winding round wire (winding wire) electrical conductors 11 so that the coils 6 form distributed windings and, at one axial end of the coil assembly 5, a winding head 7 that extends only between an inner diameter $d_i$ and an outer diameter $d_a$, in which the outer diameter $d_a$ is smaller than the diameter $D_b$ of the stator bore 9, and axially inserting the coil assembly 5 into the stator assembly 1, leading with the winding head 7, so that the coils 6 are positioned to lie in the slots 4.

A coil 6 is made of a winding wire continuously wound N times. Thus each coil 6 is a wire bundle consisting of N windings, for instance 50 windings, so that N single wires form the coil 6 viewed in cross-section but are actually segments of the continuous winding wire. The single wires, respectively wire segments, are the electrical conductors of the coil 6. The winding wire is usually a copper round wire coated with an insulating varnish, with a diameter between 0.6 mm and 2 mm.

Four different methods for manufacturing the coil assembly 5 as a cast body are described below, in which the coil assemblies 5 themselves also differ from each other with regard to the winding heads 7, 8.

Encapsulated Single Coils

According to a first method, the coil assembly 5 is made of individually encapsulated coils 6 that are subsequently nested inside each other to form the coil assembly 5. FIG. 2 shows a section of a coil assembly 5 produced in this manner with a view of the first winding head 7, also called the shaped winding head 7 in the present description. Here the coil assembly 5 comprises 18 coils 6 so that each coil 6 lies in two slots 4 but each slot 4 holds two coils 6, lying in an upper winding and a lower winding when viewed radially. In other words, the coil assembly has a two-layer structure. A coil 6 of this coil assembly is shown in various views in FIG. 3a through 3c. The coils 6 are all formed the same in this embodiment.

Each coil essentially consists of four coil segments, namely a first and second longitudinal coil segment 6a and a first and second winding head segment 6c, 6d. The two longitudinal coil segments 6a, 6b run parallel and lie radially opposite each other. The two winding head segments 6c, 6d lie axially opposite each other.

The first longitudinal coil segment 6a extends within the first slot 4a axially from the second winding head 8 to the first winding head 7, while the second longitudinal coil segment 6b extends within the second slot 4b axially from the first winding head 7 back to the second winding head 8. However, the two longitudinal coil segments 6a, 6b lie on different circumferences in reference to the motor axis 10, since the first longitudinal coil segment 6a forms the lower winding in the first slot 4a and the second longitudinal coil segment 6b forms the upper winding in the second slot 4b and therefore lies farther out radially than the first longitudinal coil segment 6a.

The first winding head segment 6c is part of the first winding head 7 and connects the end of the first longitudinal coil segment 6a of the coil 6 emerging from the first slot 4a with the end of the second longitudinal coil segment 6b entering the second slot 4b. Correspondingly the second winding head segment 6d is part of the second winding head 8 and connects the end of the second longitudinal coil segment 6b of the coil 6 emerging from the second slot 4b with the end of the first longitudinal coil segment 6b entering the first slot 4a.

The shape of the first winding head segment 6c is significant here; it can be seen in FIG. 3a-3c and is carried out in the form of an "offset end winding". It consists of five segments that transition to each other, comprising a first S-shaped segment 6ca, which connects to the first longitudinal coil segment 6a, a first curved segment 6cb, a central U-shaped segment 6cc, a second curved segment 6cd and a second S-shaped segment 6ce that connects to the second longitudinal coil segment 6b.

The first S-shaped segment 6ca turns the path of the coil coming from the axial direction of the first longitudinal coil segment 6a radially inward, so that the coil 6 is brought out of alignment with the corresponding stator slot 4, or viewed differently, projects radially over the stator teeth 3 flanking the slot. In this embodiment, the path is subsequently changed again from the radial direction back to the axial direction, but on a circumference with a diameter $d_a$ that is smaller than the diameter $D_b$ of the stator bore 9.

The first curved segment 6cb connecting to the first S-shaped segment 6ca extends along an arc in the circumferential direction around the motor axis 10, in which it also rises in the axial direction away from the stator body 1, creating space for the winding head segments 6c of the other coils 6. The U-shaped segment 6cc with its legs extending axially away from the stator body 1 connects the two curved segments 6cb, 6cd approximately in the middle section of the winding head segment 6c. Here the leg connecting to the first curved segment 6cb lies radially on the outside and the second leg connecting to the second curved segment 6cd lies radially further inward in reference to the motor axis 10; see FIGS. 3b and 3c. Thus the U-shaped segment 6cc lies in an axial plane intersecting the motor axis 10.

The second curved segment 6cd and the second S-shaped segment 6ce are essentially symmetrical counterparts of the first curved segment 6cb and first S-shaped segment 6ca. However, the second curved segment 6cd extends along an arc around the motor axis 10 with a smaller diameter or radius than the arc of the first curved segment 6cb. Furthermore, the second curved segment 6cd ends axially in the direction of the stator assembly 1, offset relative to the first curved segment 6cb; see FIG. 3b.

The second winding head segment 6d consists of three segments transitioning to each other, comprising a first curved segment 6da that connects to the first longitudinal coil segment 6a, a central U-shaped segment 6db and a second curved segment 6dc that connects to the second longitudinal coil segment 6b. Thus the second winding head segment is also carried out in the form of an offset end winding. Compared to the first winding head segment 6c, the second winding head segment 6d omits changing the path of the coil radially inward, so that the second winding head segment 6d, or more precisely the curved segments 6da and 6dc, lies/lie axially in front of the stator teeth 3. Thus the U-shaped segment 6db lies radially farther out, so that the inside diameter of the second winding head 8 is larger than the outer diameter of the rotor 13, allowing it to pass by the second winding head 8 during axial joining.

All coils 6 are shaped identically so that the same forming and casting tool can be used, and so that no special sequence of the coils needs to be considered while assembling the single coils into the coil assembly.

After winding the coil, the resulting wire bundle is wrapped with an insulating material and shaped as shown in FIGS. 3a, 3b and 3c, notably bent. Alternatively the wire can also be shaped first and subsequently wrapped with the insulating material. In this case a binding, tape, cord or spiral coiled tube can be used as the insulating material, in which the insulating material is wrapped around the wire bundle in a spiral. According to another version, the coil 6 can also be wound directly in the required shape, eliminating the need for a separate shaping step.

The wound wire bundle wrapped with the insulating material is subsequently placed into a casting mould, where it is encapsulated with a sealant. The insulating material ensures that the coil 6 is covered by a sufficient thickness of the sealant on all sides since it serves as a spacer element to the casting mould. A casting resin, for example, can be used as the sealant.

As an alternative to wrapping the wire bundle with the insulating material as described above, the casting mould can be lined with such an insulating material, for example, in the form of an insulating paper. The wire bundle can be placed on the paper, which is folded over the wire bundle so that it fully encloses the wire bundle.

According to a different manufacturing method, it is also possible to simultaneously use the casting mould to produce the required shape of the coil 6. Thus shaping the wire bundle is realised directly through insertion and adaptation to the casting mould. Furthermore, it is possible for winding or laying the windings of the winding wire to take place directly in the casting mould, eliminating a separate shaping step.

FIG. 4 shows an embodiment of a coil assembly 5 as an alternative to FIG. 2. Here the coil assembly 5 also has a two-layer structure and comprises 18 coils, so that two coils 6 lie in each slot 4 in the form of an upper winding and a lower winding.

The shape of the single coils 6 in this alternative embodiment is shown in FIGS. 5a and 5b. It differs from the first version in FIGS. 2 and 3a-3c to the effect that, on the part of the first winding head 7, a U-shaped segment lies radially on the outside, so that the first S-shaped segment 6ca on the part of the winding head 7 of the first version can be omitted. Here the coil assembly 5 has a torpedo-like overall shape. Once again the coil 6 essentially consists of four coil segments, namely a first and second longitudinal coil segment 6a and a first and second winding head segment 6c', 6d. Only the differences of the second version compared to first version are pointed out in the following.

The first winding head segment 6c' consists of four segments transitioning to each other, comprising a straight segment 6a' that forms an extension of the first longitudinal coil segment 6a, a U-shaped segment 6ca' that connects to the straight segment 6a', a curved segment 6cb' and an S-shaped segment 6cc' that connects to the second longitudinal coil segment 6b; see FIG. 5a, 5b. Due to the straight segment 6a', the U-shaped segment 6ca' projects axially beyond the S-shaped segment 6cc'. The straight segment 6a' transitions to a leg of the U-shaped segment 6ca', whose other leg lies radially further inward so that the U-shaped segment 6ca' lies in an axial plane encompassing the motor axis 10. The second leg of the U-shaped segment 6ca' turns the path of the coil back in the axial direction towards the stator assembly 1 and then transitions to the curved segment 6cb', which extends in the circumferential direction along an arc, overcoming the axial offset between the U-shaped segment 6ca' and the S-shaped segment 6cc'. Thus the curved segment 6cb' also takes a helical path here. The arc lies on a diameter $d_a$ that is smaller than the diameter $D_b$ of the stator bore 9. Thus the curved segment 6cb' is not aligned with any stator slots 4 or stator teeth 3, ensuring that the coil assembly 5 can be joined axially relative to the stator assembly 1. Furthermore, the curved segment 6*cb*' therefore ends at a radial distance from the second longitudinal coil segment 6*b*. This distance is bridged by the S-shaped segment 6*cc*'.

The shape of the second winding head segment 6*d* is essentially identical to the first embodiment and consists of a first curved segment 6*da*', a U-shaped segment 6*db*' and a second curved segment 6*dc*', in which the U-shaped segment 6*db*' lies approximately in the centre between the curved segments 6*da*', 6*dc*' and extends through the motor axis 10 within an axial plane with its legs. This axial plane is offset by approximately 90° relative to the axial plane in which the U-shaped segment 6*ca*' of the first winding head segment 6*c*' extends. The first curved segment 6*da*' extends along a first arc and the second curved segment 6*dc*' extends along a second arc that runs radially farther inward compared to the first arc.

FIGS. 6*a* and 6*b* show two snapshots of the arrangement of coils 6 to form the coil assembly 5 by nesting the single coils 6 inside each other. Two coils 6 lie next to each other in FIG. 6*a* and six coils 6 lie next to each other in FIG. 6*b*. It is clear that the curved segments 6*cb*' of the coils 6 lie axially above each other, or more precisely lie against each other axially.

Figures 7A, 7B:
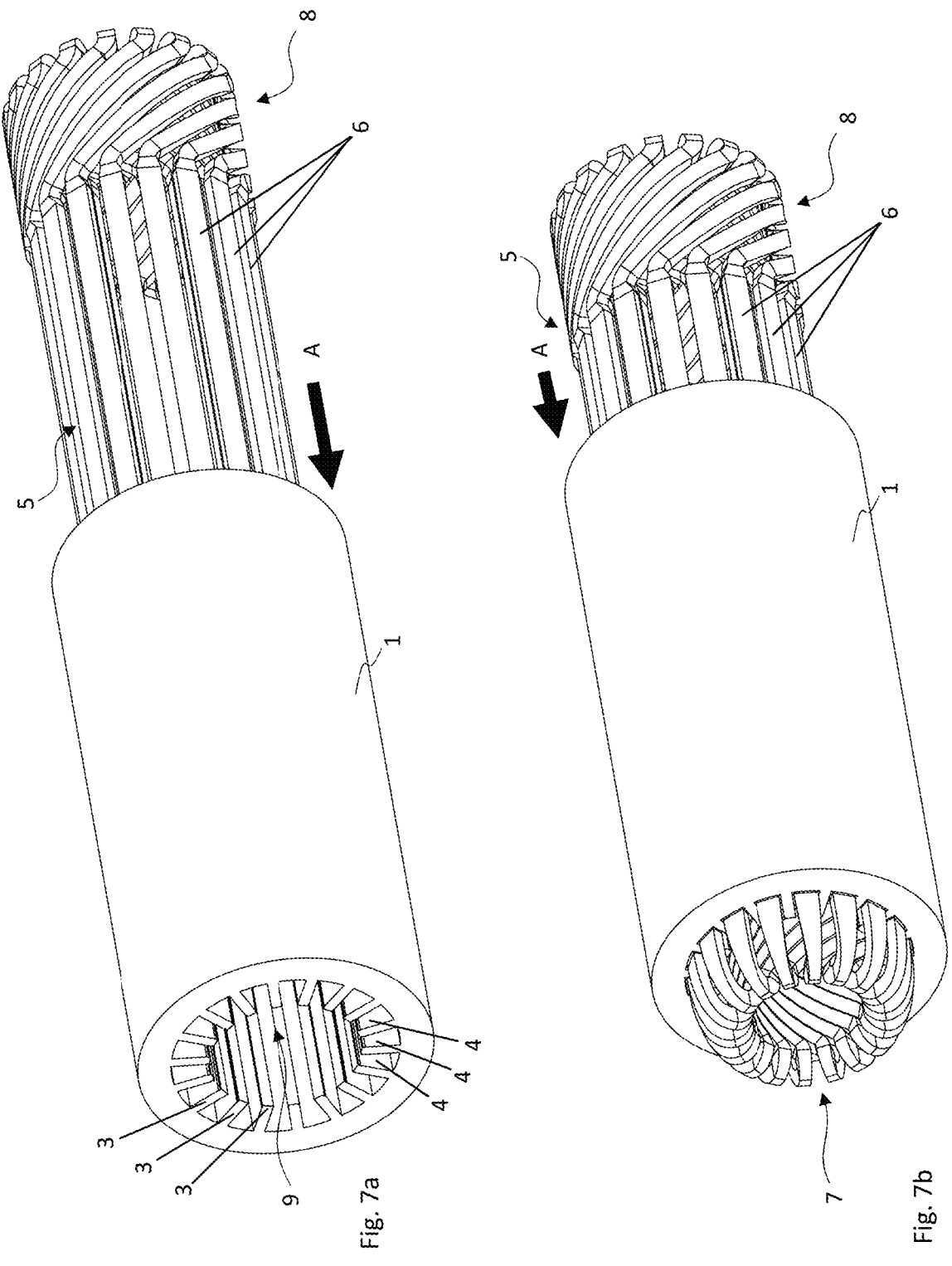
Figures 7C, 7D:
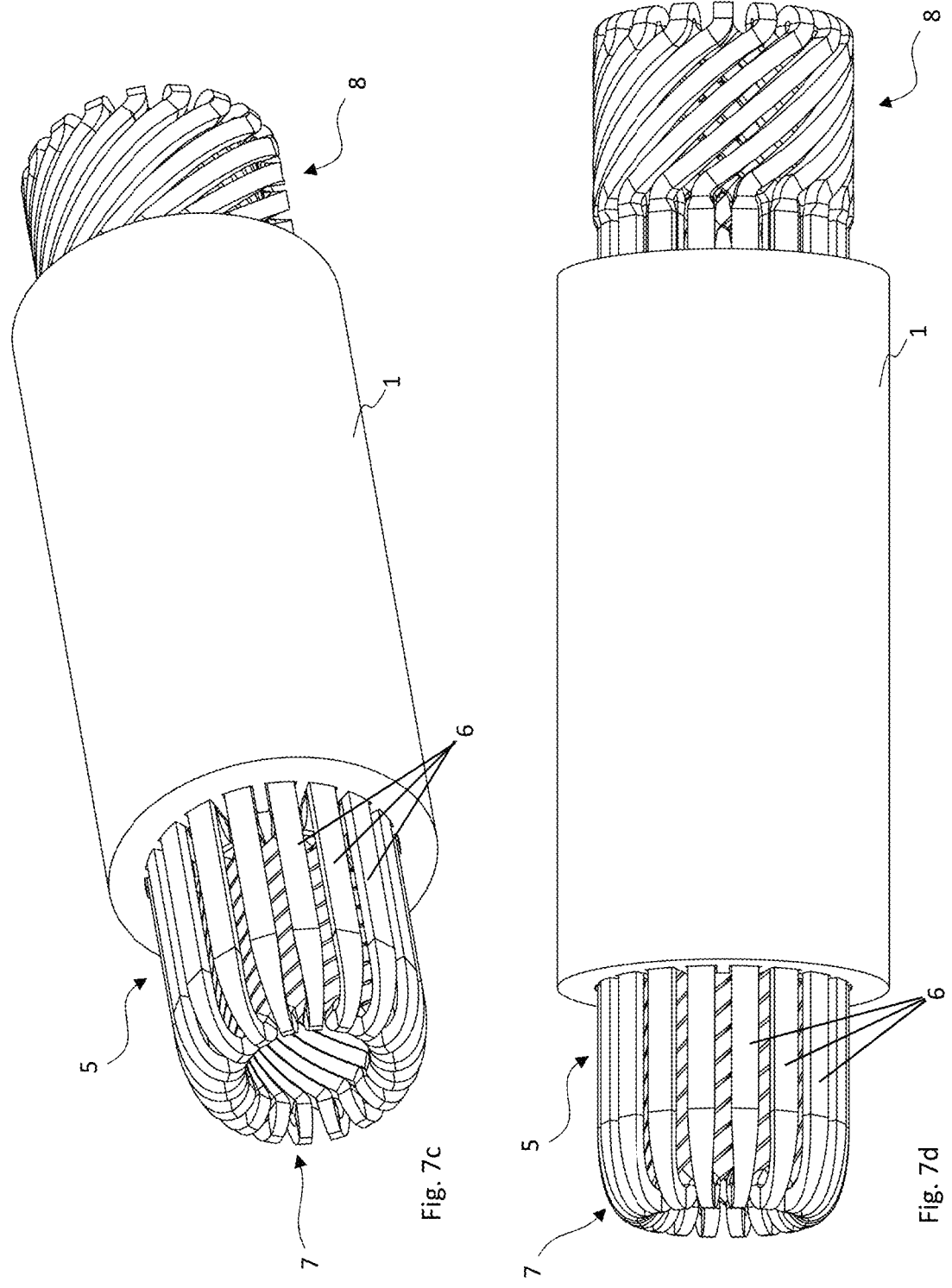

FIG. 7*a* through 7*d* illustrate the joining process of the coil assembly 5 relative to the stator assembly 1, in which the coil assembly 5 is inserted axially into the stator assembly 1 in the direction of the arrow A in FIG. 7*a*, leading with the first winding head 7. In FIG. 7*b* the first winding head 7*b* already slightly protrudes axially from the stator assembly 1. FIG. 7*b* shows how the stator teeth 3 engage in the spaces between adjacent coils 6 of the stator assembly 5. In FIG. 7*c*, the stator assembly 1 is positioned almost in its final position relative to the coil assembly 5. The end position is reached in FIG. 7*d*. FIGS. 7*c* and 7*d* show that the first winding head 7 has a considerable axial length.

A third embodiment of a coil assembly 5 with individually encapsulated coils 6 is illustrated in FIG. 8*a* through 8*c*. Here the coil assembly 5 comprises nine coils 6, so that each coil 6 lies in two slots 4 and exactly one coil 6 lies in each slot 4. Thus the coil assembly 5 has one layer. In this third embodiment, the coils 6 are all different from each other, having different axial lengths, and the second winding head 7 is asymmetrical.

With each of the coils 6, the first winding head segment 6*c* is formed by three segments that transition to each other, namely a first radial segment 6*ca*", a curved segment 6*cb*" and a second radial segment 6*cc*". The first radial segment 6*ca*" connects to the first longitudinal coil segment 6*a* and turns the path of the coil, coming from the axial direction, radially inward towards the motor axis 10 and subsequently in the circumferential direction. Connected to the first radial segment 6*ca*" is the curved segment 6*cb*", extending along an arc with a diameter $d_a$ that is smaller than the diameter $D_b$ of the stator bore 9. The curved segment 6*cb*" differs from the curved segments 6*cb*, 6*cd*, 6*db*' of versions 1 and 2 in that its path is not helical, i.e. it does not extend in the axial direction but remains within the same radial plane. This ultimately results in the different axial lengths of the coils 6. The second radial segment 6*ca*" connects to the curved segment 6*cb*" and turns the path of the coil, coming from the circumferential direction, to the radial direction and then to the axial direction before transitioning to the second longitudinal coil segment 6*b*.

In the second winding head 8 of the third version, the second winding head segments 6*d* of the coils 6 are also formed by three segments 6*da*", 6*db*", 6*dc*", namely a first curved segment 6*da*", a transition segment 6*db*" and a second curved segment 6*dc*", in which the transition segment 6*db*" lies between the first and second curved segments 6*da*", 6*dc*". The first curved segment 6*da*" connects to the first longitudinal coil segment 6*a* and extends helically along an arc on a first circumference around the motor axis 10 to the transition segment 6*db*", which forms a flat transition to a smaller diameter lying radially farther inward on a circumference around the motor axis 10. Along an arc on this second circumference, the second curved segment 6*dc*" extends helically or axially back in the direction of the stator assembly 1 and connects to the second longitudinal coil segment 6*b*; see FIG. 8*c*.

While the coil shapes differ between the two illustrated versions, the method for manufacturing the wound and individually encapsulated coils is identical; therefore, please refer to the explanations of the first version in this regard.

Drawing Technique

A second method proposes winding the coils 6 individually, i.e. laying the N windings and inserting the resulting wire bundles into a drawing tool. Through this insertion as such, the wire bundles are brought into a shape that approximates the final shape of the coil 6. Then the wire bundle can be brought into the final shape by means of the heading tool in the drawing tool. This can be done sequentially for each single coil, for a coil group—e.g. for all coils belonging to the same phase—or even for all coils 6 simultaneously.

A suitable drawing and casting tool 20 is shown in FIG. 9*a* through 9*c*. FIG. 9*a* through 9*c* show the drawing and casting tool 20 in a top view (FIG. 9*a*), a section (FIG. 9*b*) along the section boundary A-A according to FIG. 9*a* and in an exploded view (FIG. 9*c*).

The drawing and casting tool 20, referred to simply as the tool 20 in the following, comprises an oblong winding support 21 as the central element with a front axial end 35 and a rear axial end 36. The winding support 21 consists of a front winding support segment 22 and a rear winding support segment 23, respectively formed by a circular cylinder. The front winding support segment 22 has a smaller diameter than the rear winding support segment 23, so that the front winding support segment 22 is offset relative to the rear winding support segment 23, forming an annular space to hold the first winding head 7. There is a seamless transition 46 between the two segments 22, 23 of the winding support 21. While the front and rear winding support segments 22, 23 are in one piece in the illustrated embodiment, they can be separate components attached to each other in a different embodiment.

At the front axial end 35, the winding support 21 has a cone 24 in the form of a taper. This facilitates drawing the coils 6 into the tool 20 and shaping them in the area of the first winding head 7. Alternatively the cone 24 can be a separate component attached to the front winding support segment 22.

The rear winding support segment 23 has a pin 40 at its axial end formed by an offset of the rear winding support segment 23. Thus the pin 40 is in one piece with the rear winding support segment 23. However, it could also be a separate component mounted on the rear winding support segment 23.

As shown in FIG. 9*c*, the outer circumference of the rear winding support segment 23 has longitudinal slots 39 extending axially and parallel to the tool axis 44. A fin 29 lies in each of these longitudinal slots 39 with a positive fit; the fins as a whole protrude from the winding support 21 in a star shape. Overall the tool 20 has eighteen slots 39 for eighteen corresponding fins 29. The fins 29 extend to the axial end of the cone 24. They have a rectangular cross-section along their entire axial length. Their narrow longitudinal side is screwed to the rear winding support segment 23. This is done using screws inserted into corresponding bore holes 33 in the fins 29. The fins 29 have additional bore holes 34 at various locations along their length, extending through the fins 29 and having an internal thread. They are intended for the installation of a corresponding shoulder screw. When this is screwed in to the maximum extent, it first contacts the winding support 21. Continuing to screw in the shoulder screw causes the corresponding fin to be pushed off the winding support 21. This helps release the fins from the winding support 21 when they are embedded in the cast body.

There is a longitudinal cavity 28 respectively between two fins 29 adjacent to each other in the circumferential direction, which serves to hold a coil 6, or more precisely a longitudinal coil segment 6a, 6b of a coil. The fins 29 of the tool 20 correspond to the stator teeth 3 of the stator assembly 1, in which the longitudinal cavities 28 correspond to the stator slots 4.

The fins 29 extend beyond the rear winding support segment 23 so that they lie at a radial distance from the front winding support segment 22, forming the aforementioned annular space. The axial face ends 37 of the fins 29 have a radial inner flat area 38 angled relative to the cone 24, forming a funnel-shaped insertion opening that also facilitates drawing the coils 6 into the tool 20.

The tool 20 also comprises three dies 25, 26, 27 that are moveable radially relative to the winding support 21 and shape a coil 6 drawn into the tool 20 by axially exerting a compressive force. A first die 25 and a second die 26 jointly form a die formation to shape the first winding head 7, pushing the coils 6 in the tool 20 axially downward in the direction of the rear winding support segment 23. The two dies 25, 26 are axially guided on the front winding support segment 22 for this purpose.

The first die 25 consists of a ring 42 mounted on the front winding support segment 22, with radially projecting teeth 43 integrated on its outer circumference that also extend in the axial direction beyond the ring 42 to the rear winding support segment 23. Two teeth 43 adjacent to each other in the circumferential direction respectively define a slot-like space in which one of the fins 29 lies with a positive fit according to the present invention. Correspondingly each of the teeth 43 extends with a positive fit into one of the longitudinal cavities 28 formed between two fins 29 adjacent to each other in the circumferential direction. Thus the first die 25 encompasses the fins 29 with a positive fit. Viewed in cross-section, the teeth are trapezoidal and their radially outer width is greater in the circumferential direction than their radially inner width.

The second die 26 is a sleeve in the form of a circular cylinder that is mounted on the front winding support segment 22. Its axial face end is supported on the inside of the ring 42 so that the teeth 43 encompass the outside of the die 26 with a positive fit. A pressing force is thus exerted on the second die 26 by the first die 25 exerting a radial pressing force.

The third die 27 is also a sleeve in the form of a circular cylinder. It encompasses the fins 29 radially on the outside by contacting the radially outer longitudinal sides of the fins 29 with its inner circumference. The third die 27 can also be omitted. It is not shown in FIG. 9c.

Completing the drawing tool 20 with a first and second sleeve 30, 31 as well as a cover 32 forms a complete casting tool 20 in which the coils 6 can be encapsulated without pressure.

The first sleeve 30 is a circular cylinder that, like the die 27, encompasses all fins 29 radially on the outside by contacting the radially outer longitudinal sides of the fins 29 with its inner circumference. Along the inner circumference, the sleeve 30 has axially extending longitudinal slots 41 in which the fins lie with their radially outer longitudinal sides with a positive fit. Thus the first sleeve 30 delimits the longitudinal cavity 28 in the radial direction to the outside and therefore forms part of the casting mould. Consequently, the coils 6 are encapsulated within the first sleeve 30.

The longitudinal cavities 28 are closed in the axial direction by the cover 32. It forms an annular disk 32 that, in the installed state, lies with its opening 45 on the pin 40 and is moved up to the offset between the pin 40 and the rear winding support segment 23 so that it contacts the axial face end of the rear winding support segment 23. The second sleeve 31 is also a circular cylinder. It encompasses the outer circumference of both the annular disk 32 and the end of the first sleeve 30 facing it axially. The second sleeve 31 delimits the space holding the second winding head 8 to be encapsulated radially to the outside.

The tool 20 is used as follows:

The two sleeves 30, 31 and the three dies 25, 26, 27 are initially removed so the tool 20 serves as a drawing tool. The longitudinal cavities 28 are open radially to the outside and towards the front axial end 35.

A coil is initially wound, forming an annular wire bundle by laying the winding wire in N loops that form the N windings of the coil. Then the wire bundle is insulated with an insulating material, as previously explained for the embodiment with the encapsulated single windings. However, the longitudinal cavities 28 may also be lined with an insulating material, for example, a folded insulating paper, so that insulating the wire bundle outside the tool 20 can be omitted. Then the wire bundle is inserted into the tool 20.

The wire bundle is drawn in at the front axial end 35 by pressing the wire bundle extending radially on the face end between the first two fins 29, which delimit the first longitudinal cavity 28 that is to receive the coil 6. Then the wire bundle is guided over the front axial end 35 to the second two fins 29, which delimit the second longitudinal cavity 28 that is to receive the coil 6. In case of a two-pole electric motor, the first two fins 29 and the second two fins 29 lie in diametrically opposite angle segments α1, α2; see FIG. 1a. In doing so, the wire bundle is moved past the cone 24 and extending radially on the face end, is pressed between the second two fins 29. During this process, the remainder of the wire bundle hangs outside in front of the fins 29.

Subsequently the wire bundle is drawn down in the direction of the rear axial end 36, in which it contacts the cone 24. In doing so, the first and second die 25, 26 are used to press the wire bundle axially into the tool 20 until it contacts the stepped transition 46. Here the second die 26 is guided on the front winding support segment 22. At the stepped transition 46 coming from the first longitudinal cavity 28, the wire bundle radially enters the annular space formed between the fins 29 and the front winding support segment 22, occupied in FIG. 9b by the second die 26, and then extends in a curve within this annular space in a radial plane to the second longitudinal cavity 28, which it enters radially coming out of the annular space. The segment of the wire bundle lying in the annular space corresponds to the first winding head segment 6c in FIG. 3a-3c, 5a, 5b.

Then the wire bundle is pressed into the first and second longitudinal cavity 28 so that it extends axially within the longitudinal cavities 28 to the rear axial end 36. The segments of the wire bundle lying in the longitudinal cavities 28 correspond to the longitudinal coil segments 6*a*, 6*b* in FIG. 3*a*-3*c*, 5*a*, 5*b*.

Since the wire bundle forms a closed ring, the segment of the wire bundle forming the second winding head segment 6*d* in FIG. 3*a*-3*c*, 5*a*, 5*b* remains radially outside the fins 39 during this step. This stays that way during the remainder of the process as well, so that the second winding head does not lie axially in front of the stator teeth 3, as in versions 1 through 3, but is radially offset relative to it and lies axially in front of the stator ring 2.

Consequently, the wire bundle emerges radially from the two longitudinal cavities 28 at the rear axial end 36 and then extends in the circumferential direction radially outside in front of the fins from the first to the second longitudinal cavity 28. With the third die 27, the wire bundle or more precisely its second winding head segment lying radially outside the fins 29 can be pushed in the direction of the cover 32 until it contacts the cover 32. Here the third die 27 is guided by the outer longitudinal side of the fins 29. The wire bundle is stretched overall during this pressing step. The second winding head segment lies in a second annular space that is occupied by the third die 27 in FIG. 9*b*.

The described method is repeated for all coils/wire bundles.

As described above, the tool 20 comprises eighteen fins 29 so that eighteen longitudinal cavities 28 can also be formed. Thus the tool 20 is intended for manufacturing a coil assembly 5 for a two-pole motor with three coils 6 per phase U, V, W (see FIG. 1*a*), so that nine coils have to wound in total and drawn into the tool 20. Naturally the tool 20 can also have a different number of fins 29, respectively cavities 28, in other embodiments.

In order to draw the three coils 6 per phase into the tool 20, there is a special assignment of the longitudinal cavities 28 to the three coils 6. FIG. 1*c* illustrates this assignment. Insofar the method uses a special winding concept.

As illustrated in FIG. 1*c*, the coils of each phase U, V, W are distributed over two opposite angle segments α1, α2, β1, β2 and γ1, γ2 of the inner circumference of the stator, in which each angle segment comprises three adjacent slots 4 to hold the three coils of a phase U, V, W. The first phase U is examined in the following, comprising a first coil 6.1, a second coil 6.2 and a third coil 6.3, whose first longitudinal coil segments 6*a* lie in the three adjacent slots 4.1, 4.2 and 4.3 of the first angle segment α1, and whose second longitudinal coil segments 6*b* lie in the three adjacent slots 4.10, 4.11 and 4.12 of the second angle segment α2.

To obtain symmetrical winding heads 7, 8, the intent is for a coil 6 to respectively lie in those two slots 4 of opposite angle segments that are nearest each other viewed in the circumferential direction, i.e. that have the shortest distance between them on the face end of the stator assembly 1 in the circumferential direction.

In order to realise this, the intent is for the third coil 6.3, which lies in the far right slot 4.3 of the first angle range α1 in order to get from the second winding head 8 to the first winding head 7, to also use the far right slot 4.10 of the second angle range α2 to get from the first winding head 7 back to the second winding head 8. Correspondingly the first coil 6.1, which lies in the far left slot 4.1 of the first angle range α1 to get from the second winding head 8 to the first winding head 7, also uses the far left slot 4.12 of the second angle range α2 to get from the first winding head 7 back to the second winding head 8. Thus the first and third coils 6.1, 6.3 do not use any slots 4 that are opposite each other. This is however necessary for the second coil 6.2 because it lies in the middle between the first and third coils 6.1, 6.3. To obtain a symmetrical winding head 7, 8, the wire bundle of the second coil 6.2 is divided in half, forming two partial bundles 6.2*a*, 6.2*b* that are routed in circumferential directions opposite to each other.

In reference to the drawing tool 20, whose longitudinal cavities 28 correspond to the slots 4 of the stator assembly 1, this means that a first coil 6 of a phase that is inserted into a first longitudinal cavity 28 is not routed to the diametrically opposite longitudinal cavity 28, but to the one that lies two longitudinal cavities 28 closer in the anticlockwise direction. Subsequently the second longitudinal cavity 28 that is adjacent to the first longitudinal cavity 28 in the clockwise direction is left empty and the third coil of the phase is drawn into the third longitudinal cavity 28 adjacent to that; this too is not routed to the diametrically opposite longitudinal cavity 28 but to the one that lies two longitudinal cavities 28 closer in the clockwise direction. Then the middle, second coil 6 is drawn in with its first two and second two partial bundles 6.2*a*, 6.2*b*. The partial bundles 6.2*a*, 6.2*b* are laid around the cone 24 or the front winding support segment 22 in opposite circumferential directions to each other on the part of the first winding head 7. Furthermore, the partial bundles 6.2*a*, 6.2*b* are laid around the fins 29 in circumferential directions opposite to each other on the part of the second winding head 7.

Contrary to the procedure that has been described, the second coil of a phase can also be drawn into the tool 20 first, followed by drawing in the first and third coils.

FIG. 10*a* shows the drawing tool 20 with coils 6 made of wire bundles wrapped with insulating material 15 drawn into the longitudinal cavities 28. It clearly shows the first winding head 8 lying radially in front of the fins 29 and the division of the centre, second coil 6.2 into two partial bundles 6.2*a*, 6.2*b* realised within that, into which the coil 6.2 branches in the first winding head 8 in order to encompass the fins 29 respectively to the right and left. The two partial bundles 6.2*a*, 6.2*b* lie axially above the winding head segments of the first and third coils 6.1 and 6.3, which makes it clear that the second coil 6.2 was drawn into the tool 20 after drawing in the first and third coils 6.1, 6.3.

Naturally, instead of dividing the second coil 6.2 of a phase in the winding heads 7, 8, two coil sections with N/2 windings can be produced directly as the second coil and drawn into the tool 20. These coil sections with their corresponding longitudinal coil segments 6*a*, 6*b* are then inserted into the same longitudinal cavities 28. The longitudinal coil segments 6*a*, 6*b* adjacent to each other can be wrapped individually with the insulating material 15 so that two wire bundles lie in the longitudinal cavities 28 of the second coil 6.2, or jointly so that only one wire bundle lies in the longitudinal cavities 28 of the second coil 6.2.

As previously described as well, the longitudinal cavities can be lined with an insulating material, for example, a folded insulating paper, instead of wrapping the wire bundles with the insulating material 15 outside the tool 20.

To encapsulate the coils 6, the three dies 25, 26, 27 are removed from the tool 20 and the first and second sleeves 30, 31 are put over the tool. Then the sealant is poured into the tool 20 so that all coils 6 are encapsulated together, forming a monolithic cast body.

The cast body is demoulded after the sealant has hardened. To do so, the sleeves 30, 31 are first pulled off; the first sleeve 30 is moved in the direction of the front axial end 35 and the second sleeve 31 in the direction of the rear axial end 36 relative to the cast body. Subsequently the fins 29 are released from the winding support 21, notably unscrewed, and removed by pulling them out towards the front axial end 35. Finally, the winding support 21 is pulled out of the cast body axially in the direction of the rear axial end 36.

Various views of the demoulded cast body are shown in FIG. 11a through 11d. In FIG. 11b, a stator body 1 has been put axially over the cast body for illustrative purposes. The cast body forms the coil assembly 5. It essentially consists of three segments, a first ring cylinder in which the first winding head 8 is encapsulated, a number of rods extending in parallel in which the longitudinal coil segments of the coils 6 are encapsulated, and a second ring cylinder in which the second winding head 7 is encapsulated.

On one end, the rods project radially to the inside in the form of teeth from the inner surface of the first ring cylinder, see FIG. 11d, and extend axially away from it. On the other end, they transition to the second ring cylinder and project radially away from its outer surface; see FIG. 11c. In other words, the second ring cylinder lies within the space framed by the rods. The clearances between the rods are provided to receive the stator teeth, as illustrated in FIG. 11b by means of the stator assembly 1 that has been put on.

Drawing/Folding Technique

According to a third method for manufacturing the coil assembly 5, the coils 6 are folded starting from the first winding head 7 towards the second winding head 8 while drawing them into a corresponding winding support 51. This procedure is called the drawing/folding technique here. The tool 50, 51 that is used is shown in FIGS. 12a-f and 13a-g. FIG. 12a-12f illustrates the state of the tool 50 with the winding support 51 at different points in time.

Figure 12A:
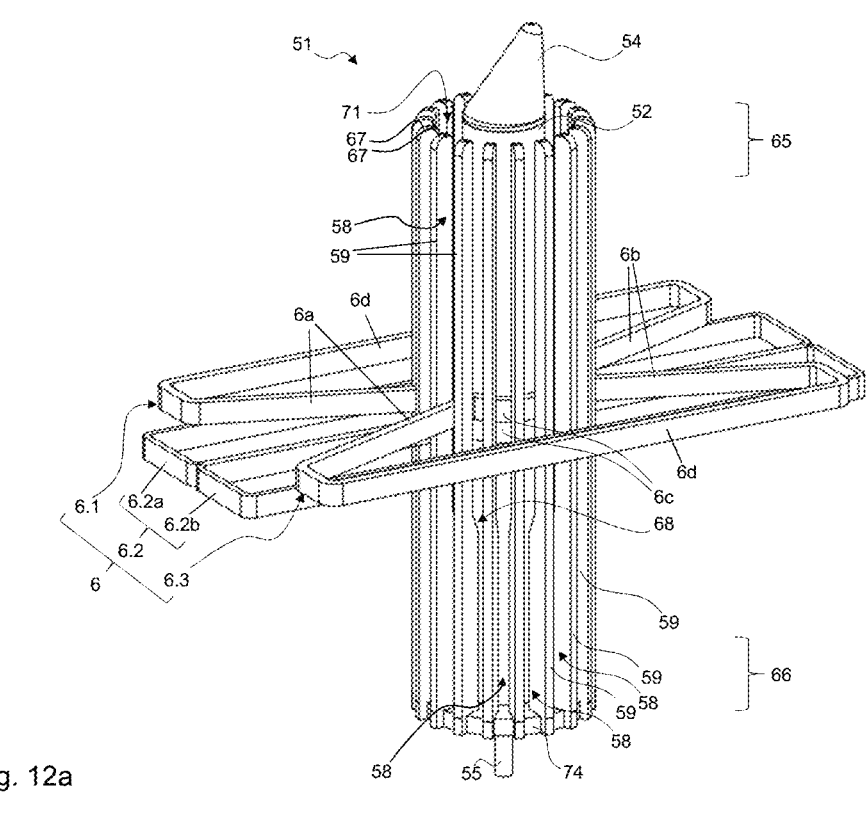

FIG. 12a shows the winding support 51 with three coils 6 of a first phase U, namely a first coil 6.1, a second coil 6.2 and a third coil 6.3, whose winding head segments 6c forming the first winding head 7 have already been drawn into the winding support 51. Here the coils 6 are shown as having a rectangular cross-section and being massive, merely for illustrative purposes. However, as with the previous embodiments, these are bendable wire bundles consisting of winding wire, more precisely round wire, laid in a number N of windings.

The winding support 51 has a central guide cylinder 52 that is exposed at a first axial end 65 that forms an insertion end of the winding support 51 to receive the coils 6. At the opposite second axial end 66, an annular base plate 74 is integrated in one piece with the guide cylinder 52; see FIG. 13b. However, the base plate 74 could also be a separate component. From the base plate 74, a number of parallel fins 59 also rise in the axial direction, arranged equidistant along the periphery of the base plate 74 and partly projecting radially from the base plate 74. This creates a guide for the locking rods 91 that are explained below. There is respectively one longitudinal cavity 58 between two fins 59 adjacent to each other in the circumferential direction, into which a longitudinal segment 6a, 6b of a coil is drawn. Furthermore, there is an annular space 71 between the central guide cylinder 52 and the fins 59 to guide each of the first winding head segments 6c of the coils 6 from a longitudinal cavity 58 along an arc around the guide cylinder 52 to another longitudinal cavity 58, and to enable pushing this first winding head segment 6c within the winding support 51 in the axial direction to the second axial end 66 or in the direction of the base plate 74.

The guide cylinder 52 has a head in the form of an asymmetrical cone 54 at the first end 65, which serves as a deflecting eccentric and is referred to as the eccentric cone in the following. The eccentric cone 54 has a shell surface that is steeper on one side than on the opposite side. The eccentric cone 54 is connected to a rotatable pin 55 extending through the guide cylinder 52 and projecting from the underside of the base 74. The eccentric cone 54 can be rotated around the central pin 55 to position the less steep shell surface so that it faces towards the curved segment 6cb to be formed on the coil 6 that is to be drawn in. The coil 6 then slides along the less steep side of the eccentric cone 54 down into the annular space 71.

The annular space 71 is open in the axial direction at the first axial end 65 for insertion of the coils 6.1, 6.2, 6.3. To facilitate insertion, the face ends 67 of the fins 59 are rounded. The fins 59 end at the same level as the guide cylinder 52 so that the eccentric cone 54 projects axially relative to the face ends 67 of the fins 59.

As shown in FIG. 12a, the first and third coils 6.1, 6.3 lie in the same radial plane and axially above the second coil 6.2, i.e. on the side of the first axial end 65 (insertion end) of the second coil 6.2. Consequently they were inserted into the winding support 51 after the second coil 6.2. FIG. 13g shows the winding support 51 and the coils 6.1, 6.2, 6.3 with their arrangement in a top view. As already explained for the second embodiment, the second coil 6.2 consists of two coil sections 6.2a, 6.2b in order to obtain symmetrical winding heads 7, 8. The two coil sections 6.2a, 6.2b form common longitudinal coil segments 6a, 6b and are thus drawn into the same longitudinal cavities 58.

The assignment of the longitudinal cavities 58 to the individual coils 6.1, 6.2, 6.3 is as explained in reference to FIG. 1c. Thus only the two longitudinal cavities 58 assigned to the second coil 6.2 lie diametrically opposite each other, while the two longitudinal cavities 58 respectively assigned to the second and third coils 6.1, 6.3, in reference to the second coil 6.2, lie on the same side in the right or left half-space, or put differently, within the same circumferential semi-circle; see FIG. 13g.

The fins 59 have a rectangular cross-section. Their radial width is larger on the second axial end 66 than on the first axial end 65, in which there is a linear transition 68 opposite the guide cylinder 52 between a first fin segment with the smaller radial width and the second fin segment with the larger radial width. The linear transitions 68 of the fins 59 respectively form part of an inner cone surface that serves as a support for a heading tool 56, which has a corresponding outer cone 57. Due to the different radial widths of the fin segments, the annular space 71 is radially wider in the area of the first fin segments than in the area of the second fin segments.

Figure 12B:
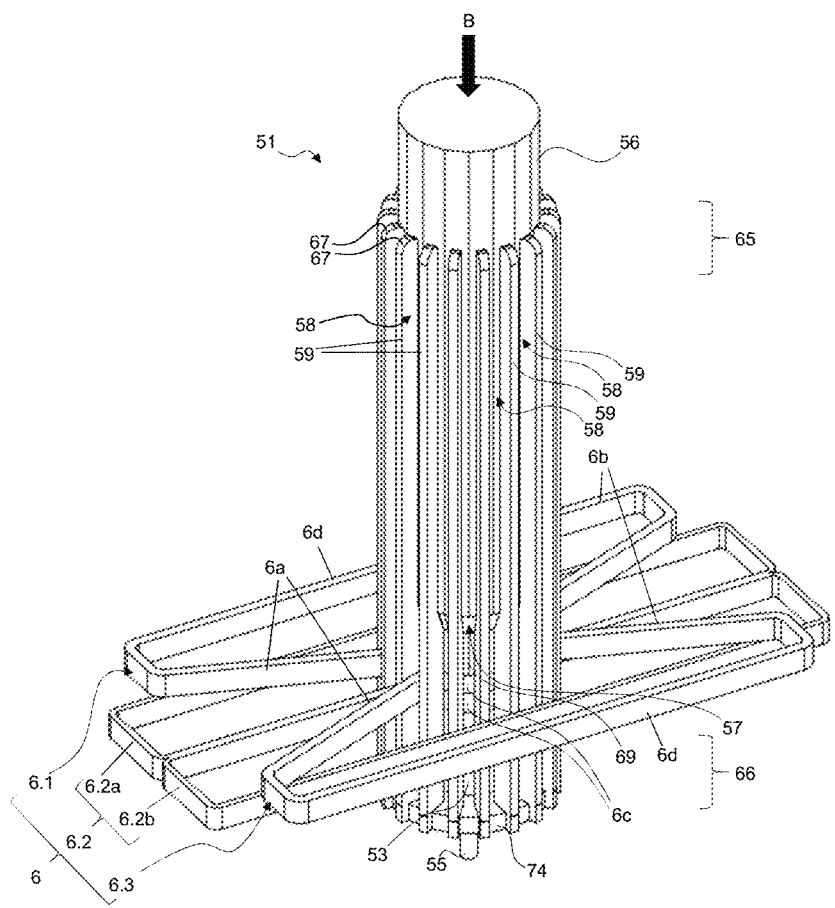

In FIG. 12b the aforesaid heading tool 56 has been moved into the winding support 51 in the axial direction of the arrow B, filling the annular space 71, and has pushed the coils 6.1, 6.2, 6.3 to the second axial end 66 or in the direction of the base plate 74. The heading tool 56 is carried out as a hollow cylinder, in which the central guide cylinder 52 extends into its inner cavity 73; see FIG. 13a. The shell surface of the pressing cylinder 56 is formed by flat areas (facets) to fit flush against the radial inner face ends of the fins 59. Given a number n of fins 59, the outside cross-section of the heading tool 56 consequently forms an n-sided polygon.

The head 69 facing towards the second axial end 66 of the winding support 51 has a smaller outer diameter than the remainder of the heading tool 56, in which there is a conical segment between the head 69 and the aforesaid remainder, forming the aforementioned outer cone 57. FIG. 12b shows that the heading tool 56 contacts the linear transitions 68 of the fins 59 with its outer cone 57 so that these linear transitions 68 form stops for the heading tool 56 and thus define the maximum insertion depth for the heading tool 56, which has been reached in FIG. 12b. Here the coils 6.1, 6.2, 6.3 lie axially in front of the head 69 with their first winding head segments 6c.

FIG. 12c now shows the tool 50, 51 with the winding support 51 and the fixture 50 for drawing in and folding the coils 6, which is also used for encapsulating them. The fixture 50 is moveable in the axial direction relative to the winding support 51.

Figure 12D:
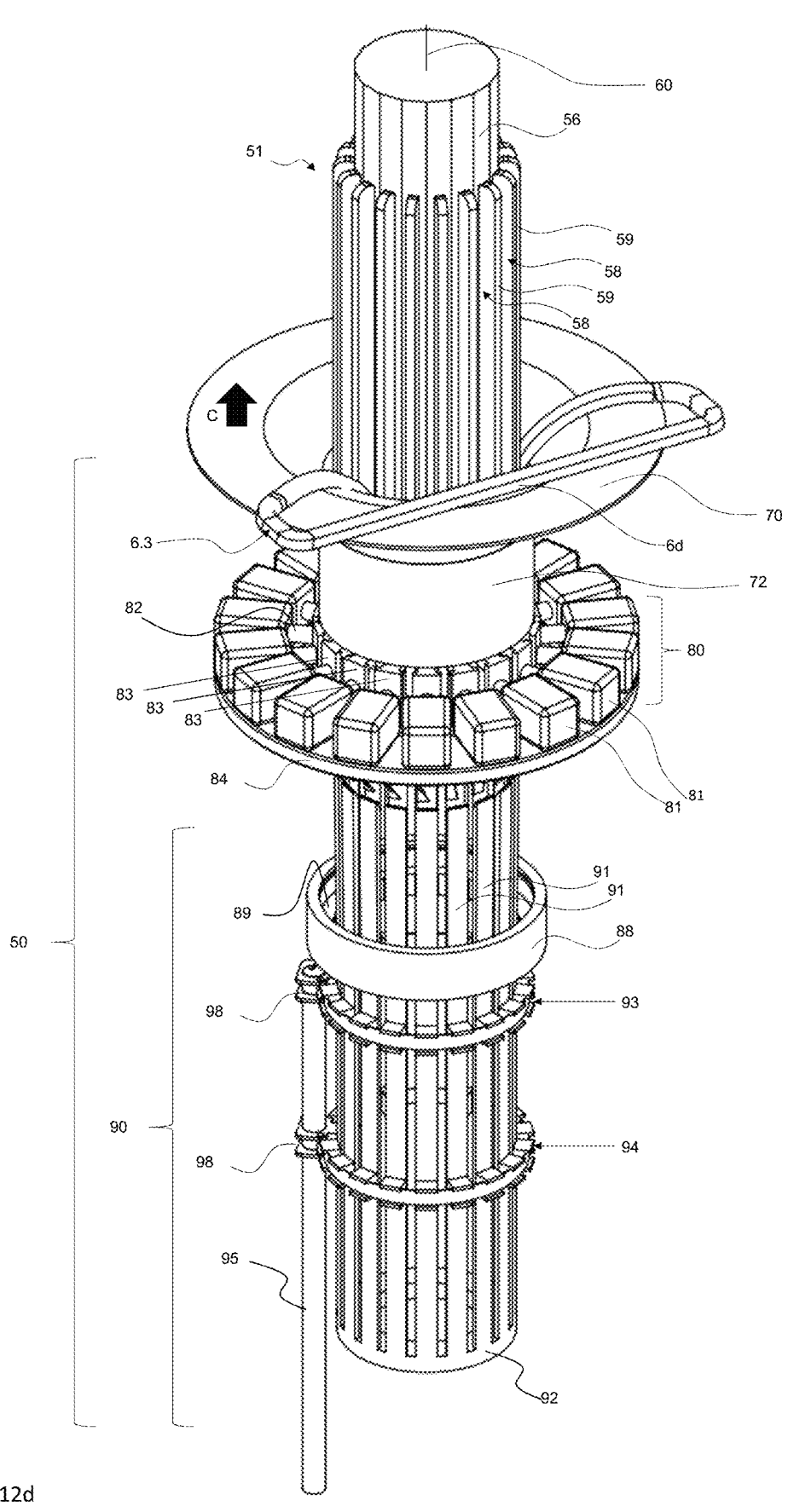

The fixture 50 comprises a drawing device 70, 80 that is configured to fold up the coils 6 and press them into the longitudinal cavities 58. The drawing device has a hyperbolic drawing cone 70 that is pushed axially over the winding support 51 starting from the second axial end 66 in the direction of the arrow C. The drawing cone 70 has a radial collar 75 in the form of an annular disk on which the individual coils 6 rest prior to folding. A hyperbolic segment 76 of the drawing cone 70, see FIG. 13a, connects the collar 75 with a cylindrical segment 77 that encompasses the fins 59 radially on the outside and moves along them. During the axial movement of the drawing cone 70 to the first axial end 65 relative to the winding support 51, the hyperbolic segment 76 progressively folds up the coils 6 so they line up in the axial direction parallel to the winding support 51, whereby the longitudinal coil segments 6a, 6b are automatically pressed into the corresponding longitudinal cavities 58 from which they originally emerged radially starting from the first winding head 7. The folding movement is illustrated in FIG. 12d, for which FIG. 13a shows a cross-sectional view along an axial section through the tool axis 60. The section passes through the first coil 6.1 while the third coil 6.3 is not shown. In these figures the drawing device 70, respectively the insertion cone 70, has already been pushed partly over the winding support 51.

Note that FIG. 13a shows the sectioned first coil 6.1 near the base plate 74, i.e. much deeper than the heading tool 52 can push the first winding head segment 6c of the first coil 6.1. This is because the coils 6 of the other phases have already been inserted into the winding support 51 as well, but are not shown in FIG. 13a. The first winding head segments 6c of these other coils 6 are between the winding head segment 6c of the first coil 6.1 and the heading tool 52, which has consequently pushed all first winding head segments together ahead of it in the direction of the base plate. According to the present invention, the first winding head segment 6c of the second coil 6.2m lies between the first coil 6.1 and the base plate 74, i.e. under the first coil 6.1; see FIG. 12a, 12b.

On the side of the insertion cone 70 axially opposite the winding support 51, there is a sleeve 72 that is moved together with the insertion cone 70 on the outside over the winding support 51 toward the first axial end 65 to an end position, where it forms a radial outer delimiter for encapsulating the second winding head 8; see FIGS. 12f and 13b. A ring 88 is attached to the sleeve 72 for sealing and fully encompasses its outer circumference from the underside. It has an inner land for this purpose so that the inner radius of the ring 88 is larger on the side of the sleeve 72 than on the side facing away from it. The land forms a step 89 with which the ring 88 lies against the face end of the sleeve 72.

Furthermore, the drawing device 70, 80 comprises a press ring actuating element 80 shown by itself in FIG. 13d. It has a number of sliding dies 84 arranged in an annular shape, corresponding to the number of the longitudinal cavities 58, which are pushed onto the winding support 51 following the sleeve 72 so that each sliding die 83 projects into one of the longitudinal cavities 58 in order to press the corresponding longitudinal coil segment 6a, 6b of the respective coil 6 deeper into the corresponding longitudinal cavity 58. All sliding dies 84 collectively form a press ring. FIG. 13a shows that the radial face end of a sliding die 83 lies against the longitudinal coil segment 6a of the coil 6.3 and presses it radially inward. The sliding dies 83 move in this radial position between the fins 59 along the winding support 51 to the second winding head 8 at the first axial end 65.

In order to perform the aforementioned task, the sliding dies 83 are approximately trapezoidal in their radial cross-section, projecting into a longitudinal cavity 58, essentially form-fitting. The radially outer reverse side of the sliding dies 83 is extended towards the two circumferential sides by respectively one protrusion 83a, 83b so that a sliding die 83 is approximately T-shaped. FIG. 13c also shows that the top edge 83c of the sliding dies 83 facing the drawing cone 70 is rounded. This facilitates sliding along the longitudinal coil segments 6a, 6b as well as moving over coil segments projecting radially from the longitudinal cavity 58 and pushing them radially back into the longitudinal cavity 58.

Each sliding die 83 is held in a respective shock resistant block 81 by a shaft 82. The shock resistant blocks 81 are mounted on a mounting ring 84 in an annular arrangement so that the sliding dies 83 extend radially to the tool axis 60. The sliding dies 83 are radially moveable relative to the shock resistant blocks 81 and can be pressed into the shock resistant blocks 81 against a restoring force. To this end, the shock resistant blocks 81 can be made of an elastic material or be filled with one, or contain a mechanical energy storage device such as a spring, in which the material or spring in its stress-free state pushes the shaft 82 with sliding die 83 away from itself and is compressed by a radial movement of the sliding die 83 to the outside.

The press ring actuating element 80, as previously explained, is moved in the direction of the first axial end 65 to the second winding head 8. Here the longitudinal coil segments 6a, 6b necessarily project radially from the longitudinal cavities 58 in order to then be curved to the right or left around the fins 59. Due to the radial projection of the longitudinal coil segments 6a, 6b from the longitudinal cavities 58 toward the second winding head 8, the sliding dies 83 are pushed radially outward into the shock resistant blocks 83 with the progressive axial movement toward the first axial end 65. This in turn facilitates the movement of the press ring actuating element 80 over the sleeve 72.

Figure 12E:
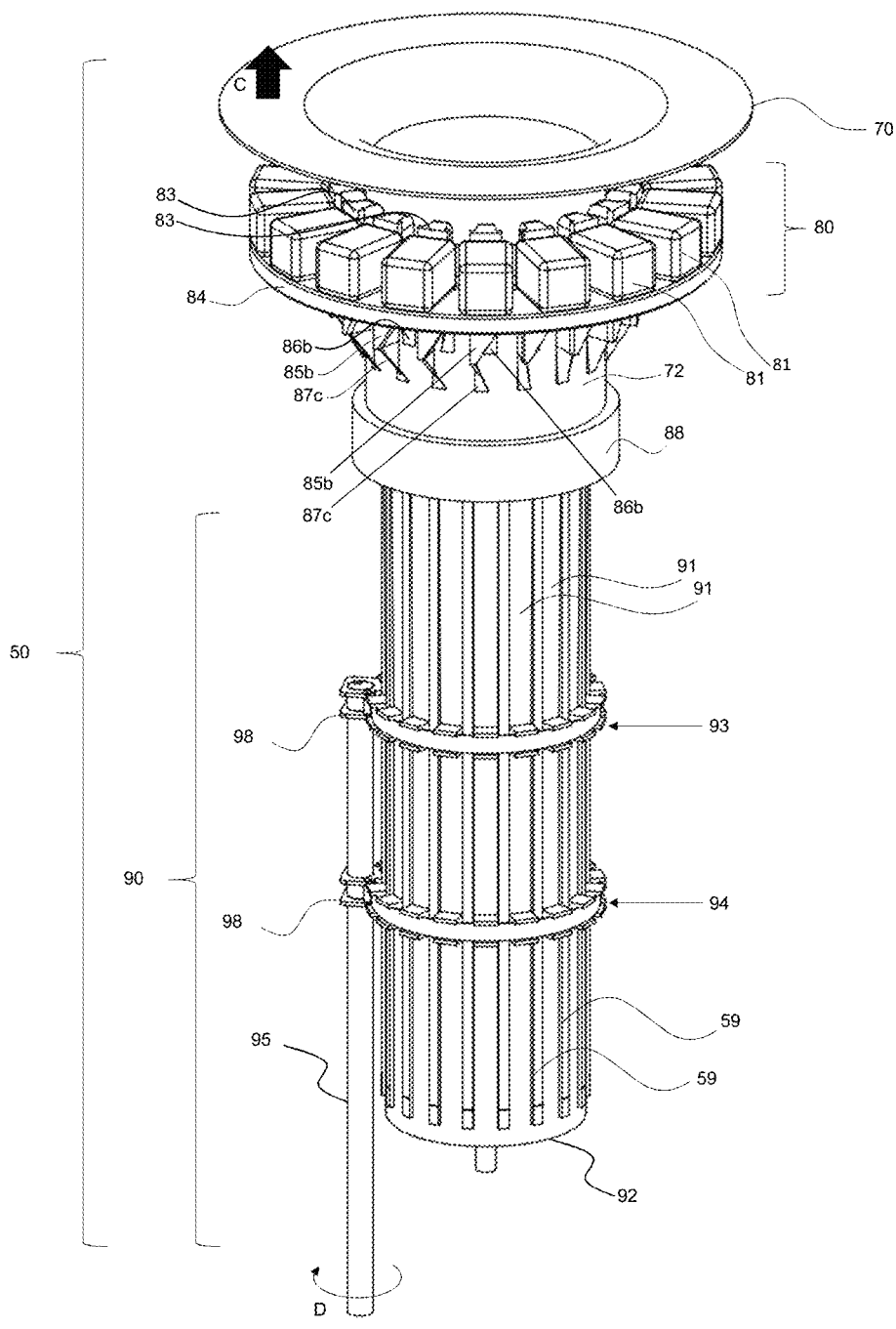

As shown in FIG. 12e, the press ring actuating element 80 in the end position of the sleeve 72 is moved farther up relative to the winding support 51, namely to the outside over the sleeve 72. To do so, the sliding dies 83 are also pushed into the shock resistant blocks 81 by the radial thickness of the sleeve 72 so that the press ring actuating element 80 can be moved over the sleeve 72. The drawing device 70, 80, i.e. the drawing cone 70 and the press ring actuating element 80, can be subsequently removed upward.

FIG. 13d illustrates a guiding and folding element 85 on its own, which has the press ring actuating element 80 below each sliding die 83. The effect of the guiding and folding element 85 is also shown, which is intended for folding an insulation 15 in the form of an insulating paper during the movement of the press ring actuating element 80 around the electrical conductor 11 so that it is fully encased by the insulation 15. Here the electrical conductor 11 is shown as rectangular, merely by way of example, although it is a round or oval wire bundle in practice.

The longitudinal cavities 58 are lined with the insulation 15 prior to the insertion of the coils 6. The insulation 15 has a U-shaped cross-section, in which a right side flank 15a and a left side flank 15b project radially from each of the longitudinal cavities 58.

A guiding and folding element 85 consists of a back part 85b, here in the form of a right-angled triangle, with a first front end in the movement direction E that has a first folding blade 86b integrated on the right side and a rear end in the movement direction E that has a second folding blade 87c integrated on the left side. Thus the first and second folding blades 86b, 87c on the one hand are at a distance from each other axially, in which the first folding blade 86b leads, and on the other hand arranged opposite each other in reference to a longitudinal cavity 58. Here the first folding blade 86b is intended for folding the right side flank 15a of the insulation 15 over the electrical conductor 11 and the second folding blade 87c is intended for folding the left side flank 15b of the insulation 15 over the electrical conductor 11.

The folding blades 86b, 87c essentially project at a right angle from the back part 85b in the direction of the longitudinal cavity 58.

Each of the folding blades 86b, 87c is defined by a rectangular basic shape with a greater length than width. Both folding blades 86b, 87c extend opposite to the movement direction E with their longitudinal axis or, more simply put, to the rear.

The first folding blade 86b is twisted by 90° along its longitudinal axis so that its width from a radial alignment with the longitudinal cavity 58 at the proximal end 86bo transitions continuously to a parallel alignment with the longitudinal cavity 58 at the distal end 86bu, and the distal end 86bu simultaneously lies close to the cavity in order to contact the electrical conductor 11 as a tongue. As shown in FIG. 13d, the right side flank 15a of the insulation 15 is guided long the inner side of the first folding blade 86b facing the left side flank 15b and increasingly turned over or folded over the electrical conductor 11 due to the twist of its longitudinal axis during the movement of the guiding and folding element 85 in the direction E.

The second folding blade 87c is folded by 90° along its diagonal so that a first segment 87co on the right side of the diagonal folding line is positioned radially to the longitudinal cavity 58 and a second segment 87cu on the left side of the folding line lies parallel to the longitudinal cavity 58 and close to it in order to contact the electrical conductor 11 as a tongue. As shown in FIG. 13d, the left side flank 15b of the insulation 15 is guided along the inside of the second folding blade 87c facing the right side flank 15a and turned over or folded over the electrical conductor 11 due to the diagonal fold during the movement of the guiding and folding element 85 in the direction E.

Since the first folding blade 86b leads, the right side flank 15a of the insulation 15 is folded first, so that the second folding blade 87c folds the left side flank 15b of the insulation 15 over the previously folded first side flank 15a.

The first folding blade 86b is connected to the front end of the guiding and folding element 85 only on its longitudinal side at its proximal end 86bo, so quasi with a point connection. The guiding and folding element 85 at the same level opposite the first folding blade 86b has a side wall 87b that is integrated with the back part 85b. The left side flank 15b of the insulation 15 is guided along this side wall 87b as well. The second folding blade 87c projects from the side wall 87b with the first segment 87co integrated into the side wall 87c.

As illustrated in particular by FIGS. 13a and 13c, there is a guiding and folding element 85 of the type described above underneath each sliding die 83. FIG. 13a shows that the sliding dies 83 have an axial extension 85a, 85b on their radially outer reverse side, pointing down or against the intended movement direction E of the drawing device 70, 80. The extension 85a, 85b is of one piece with the respective sliding die 83. The extension 85a, 85b forms the guiding and folding element 85 and consists of a first extension segment 85a, 86a, 87a, axially connected directly to one of the sliding dies 83, and a second extension segment 85b, 86b, 87b connected below that.

FIG. 13c shows that the first extension segment consists of a back part 85a and two guide walls 86a, 87a that are integrated on the sides of the back part 85a in the circumferential direction and project approximately radially to the fixture axis 60. They ensure that the right and left side flanks 15a, 15b of the insulation 15 stay aligned with the longitudinal cavity 58 and do not project from it. The side flanks 15a, 15b of the insulation 15 are held between the guide walls 86a, 87a.

The second extension segment 85b, 86b, 87b is formed by the part of the guiding and folding element 85 shown in FIG. 13d, namely by the back part 85b, the first folding blade 86b and the side wall 87b, as well as the second folding blade 87c.

As shown further in FIG. 12c, the ring 88 with the land, which forms a step 89 in the transition from the side of the ring 88 facing the press ring actuating element 80 with a smaller radial thickness to the side of the ring 88 facing away from the press ring actuating element 80 with a larger radial thickness, lies axially below the press ring actuating element 80.

The fixture 50 further comprises a locking mechanism 90 that, in the initial state of the method, is also located below the winding support 51 in order to move axially into the winding support 51 from the direction of the second axial end 66 up to an end position, which is shown in FIG. 12e, in order to radially close the longitudinal cavities 58 so the coils 6 can be encapsulated.

The locking mechanism 90 has a number of locking rods 91 corresponding to the number of longitudinal cavities 58 that are intended for form-fitting insertion into the longitudinal cavities 58. For this purpose, the locking rods 91 are positioned equidistant in an annular arrangement and, on their end opposite the winding support 51, joined together as one piece with a common supporting ring 92. Approximately in the middle in reference to their axial overall length and in the middle of the lower half, the locking rods 91 have respectively one locking ring 93, 94 that pushes the locking rods 91, or more precisely all locking rods simultaneously, radially inward. FIG. 13f shows the upper locking ring 93 in a top view of the locking mechanism 90. The structure of the second locking ring 94 is identical.

Each of the locking rings 93, 94 is formed by an annular arrangement of track blocks 97 mounted on the radial outer side of the locking rods 91 at the same axial height so that all track blocks 97 lie in the same radial plane. The track blocks 97 on their reverse side facing away from the corresponding locking rod 91 have a track 97a that is bordered by two axially opposite side flanks 97b, 97c; see FIG. 13b. A tensioning belt 96 passing around the locking rods 91 and connecting the track blocks 97 lies in the track 97a, held in position by the side flanks 97b, 97c so it cannot slip out of place.

A holder 98 is arranged on one of the locking rods 91 respectively at the height of the first and second locking rings 93, 94 for a torque rod 95 that passes through these holders 98 and is held within them so it can rotate. As shown in FIGS. 13b and 13f, each of the holders 98 bears a cylindrical pin 99, on the circumference of which the corresponding tensioning belt 96 is routed tangentially and on which the tensioning belt 96 is attached with one of its ends. The other end of the tensioning belt 96 is routed tangentially to the torque rod 95 and attached to this. By rotating the torque rod 95 in the circumferential direction in which the tensioning belt 96 lies tangentially against the torque rod 95, i.e. in the direction of the arrow E in FIG. 13f, the tensioning belt 96 is increasingly wrapped around the torque rod 95 so that its length decreases and thus the diameter of the tensioning belt 93, 94 decreases. This in turn causes the locking rods 91 to be moved radially inward towards the tool axis 60 to close the longitudinal cavities 58.

In the state where the locking mechanism 90 has been axially inserted into the winding support 51, as shown in FIG. 12e, the aforementioned rotation of the torque rod 95 and thus the tensioning of the locking rings 93, 94 is realised so that the locking rods 91 are pressed between the fins 59, thereby closing the longitudinal cavities 58 of the winding support 51 in the radial direction.

Simultaneously the sleeve 72 on the first axial end 65 lies at the level of the second winding head 8 and delimits it radially to the outside. The drawing device 70, 80 or more precisely the drawing cone 70 and the press ring actuating element 80 can be removed in the end position or moved axially to a non-interfering distance from the winding support 51, resulting in the state shown in FIG. 12f. For simplicity, the second winding head 8 is shown here only as a massive ring, even though it consists of single wire bundles lying axially above each other with numerous clearances between them and to the sleeve 72. These are filled when the coils 6 are encapsulated.

The sealant is poured without pressure from the first axial end 65, i.e. the end of the second winding head 8. It flows through the clearances and cavities between the wire bundles of the coils 6 in the second winding head 8 and the longitudinal cavities 58 to the first winding head 7, fully encapsulating all coils along with the winding heads 7, 8. The encapsulated coil body 5 is shown in FIG. 13e.

Needle Winding Technique

Another method for manufacturing the coil body 5 consists of winding the single coils with a needle winding device within a winding support and then encapsulating them inside this winding support. A tool 20' forming this winding support is shown in FIG. 14a-14e. FIG. 15a-15c shows the tool 20' in practice.

The layout of the tool 20' essentially corresponds to that of the drawing and casting tool 20 in FIG. 9a through 9c. Therefore, please refer to the explanations for those figures. Only the differences are described below. Unlike the drawing tool 20, the winding tool 20' does not have the first, second and third dies 25, 26, 27 due to the method. The winding tool 20' also comprises a winding support 21 with a front winding support segment 22 and a rear winding support segment 23, in which the front winding support segment 22 has a smaller diameter than the rear winding support segment 23, so that the front winding support segment 22 is offset relative to the rear winding support segment 23, forming an annular space to receive the first winding head 7. The front axial end 35 of the winding support 21 has a cone 24 and the rear axial end 36 has a pin 40. A mounting sleeve 47 is attached form-fitting on the pin 40 and the second winding head 8 is wound on that. The mounting sleeve 47 projects radially relative to the rear winding support segment 23.

The rear winding support segment 23 has parallel longitudinal slots 39 distributed equidistant over the circumference to receive fins 29, of which only those required for winding a single phase are mounted in FIG. 14a-14e. In greater detail, eight fins 29 are mounted here in groups of four fins 29 each, opposite each other in angle segments α1, α2. As before, there is a longitudinal cavity 28 respectively between two fins 29 adjacent to each other in the circumferential direction. The fins 29 extend toward the front axial end 35 beyond the rear winding support segment 23 so that they lie at a distance from the front winding support segment 22, forming the aforementioned annular space.

In contrast to the illustrated drawing tool 20, the fins 29 have a T-shaped cross-section so that the slot opening is narrower than the slot width on the inside of the longitudinal cavities 28. This reduces the risk of the winding wire emerging from a longitudinal cavity 28. The longitudinal edges of the fins 29 that face each other have been bevelled, so that a wire that may have been wound inaccurately nevertheless slides into the longitudinal cavity 28 along the flat area tilted toward the longitudinal cavity. All other edges of the fins 29 on their face end opposite the cone 24 are bevelled as well.

On the part of the rear axial end 36, a retaining element 48 is mounted radially outside on each fin 29, notably screwed. Each retaining element 48 comprises a finger 49 that extends in the axial direction and lies radially farther out than the corresponding fin 29.

Winding the winding support 21 is carried out with a needle winding device that continuously feeds the winding wire under tension, in which the needle winding device and the winding support 21 are moveable relative to each other, bidirectionally in at least 3 spatial directions, namely axial, radial and in the circumferential direction.

The longitudinal cavities 28 are lined with an insulating paper 15 prior to winding. As shown in FIG. 15a, this insulating paper 15 is folded in a U shape and projects at the rear axial end 36 of the longitudinal cavities 28 to prevent lateral contact of the winding wire with the fins 29. The T shape of the fins 29 keeps the insulating paper 15, which contacts the protrusions of the T-fins 29 projecting in the circumferential direction with its longitudinal sides, from sliding out. FIG. 15a also shows that the mounting sleeve 47 is sheathed with an insulating material 15.

Winding a coil 6 is now carried out in the tool 20' in a manner that is known as such, for example, by repeatedly a) drawing in the winding wire through an axial linear movement of the needle winding device from the rear axial end 36 in the longitudinal direction of the winding support 21 parallel to the fixture axis 44 to the front axial end 35 into a first longitudinal cavity 28 that is radially open to the outside, from which the wire emerges axially at the end of the first axial movement, b) rotating the winding support 21 around the axis 44 with a first rotational movement until the needle winding device is aligned with a certain second longitudinal cavity, into which the winding wire is to be drawn, c) drawing the winding wire, with a second linear movement of the needle winding device, back from the front axial end 35 in the longitudinal direction of the winding support 21 parallel to the fixture axis 44 to the rear axial end 35 into the second longitudinal cavity 28 that is radially open to the outside, from which the wire emerges axially at the end of the second axial movement, and d) rotating the winding support 21 back around the axis 44 with a second rotational movement until the needle winding device is once again aligned with the first longitudinal cavity, into which the winding wire is to be drawn.

Prior to the first rotational movement in step b), a linear movement of the needle winding device in the direction of the tool axis can be performed if necessary to draw the winding wire radially inward. Correspondingly a linear movement of the needle winding device in the direction away from the tool axis can be performed if necessary after the first rotational movement in step b) in order to draw the winding wire radially outward. The two radial movements are required if the rotational movement in step b) is performed with a comparatively small angle, so that the alignment of one or more fins 29 lies on a connecting line between the start point and end point of the rotational movement. In this case, there is a risk that the winding wire may not be positioned correctly in the annular space during the first rotational movement and second linear movement.

The aforementioned movements are repeated according to the N windings to be drawn in to form a coil 6. Naturally the aforementioned movements can also be performed by the respective other component in the sense of a kinematic inversion of the direction.

The first longitudinal coil segment 6a of a coil 6 is laid by the sum of the first axial movements, the second longitudinal coil segment 6b by the sum of the second axial movements. Furthermore, the first winding head segment 6c of the coil 6 is laid by the sum of the first rotational movements and the second winding head segment 6d by the sum of the second rotational movements.

Due to the cone 24 on the head of the winding support 21 with the fins 29, the first winding head segment 6c is automatically formed within the annular space between the fins 29 and the front winding support segment 22, i.e. offset radially inward relative to the teeth 3 of the stator assembly to which the fins 29 quasi correspond. The second winding head segment 6d on the other hand is formed axially in front of the fins 29 so that it later lies axially in front of the stator teeth 3.

The winding concept, or more precisely the assignment of the longitudinal cavities 28 to the individual coils, is carried out as previously explained in reference to FIG. 1c and FIG. 12a, 13f. Thus the second coil 6.2 of a phase is wound in diametrically opposite longitudinal cavities 28 and divided into two coil sections 6.2a, 6.2b that are routed in different circumferential directions from one longitudinal cavity to the other in order to obtain symmetrical winding heads 7, 8. This is shown in FIG. 15b with a view of the second winding head 8, which however initially consists only of this second coil 6.2 here.

The end and the start of the winding wire 11 of the second coil can be seen as well. The second coil 6.2 can be wound by fully winding the first coil section 6.2a completely and then winding the second coil section 6.2b completely, i.e. by initially producing all N/2 windings in the same direction sequence. Alternatively one winding of the first coil section 6.2a and one winding of the second coil section 6.2b can be wound alternately.

The two other coils 6.1, 6.3 of the phase are then wound one after the other, respectively in the two longitudinal cavities 28 that are adjacent to the longitudinal cavities 28 of the second coil 6.2 within the same circumferential semi-circle; see FIG. 1a, 13f. FIG. 15c shows the fixture 20' with wound first and second coils 6.1, 6.2, in which the first coil 6.1 lies radially on the first coil section 6.2a of the second coil 6.2 in the area of the second winding head segment 6d that is visible here.

All coils 6 of all phases can be initially wound in the illustrated manner and subsequently encapsulated together. With this full encapsulation, the coil assembly 5 forms a monolithic cast body (full cast body). As with the fixture 20 according to FIG. 9a-9c, a cover 32 is put over the mounting sleeve 47 for this purpose, a cylindrical first sleeve 30 encompassing the fins 29 is put over the fins 29 and the cylindrical second sleeve 31 is put over the cover 32 and the second winding head 8. Subsequently the winding tool 20' completed in this way is filled with sealant.

According to an alternative, only the coils 6 for a single phase U, V, W are wound and then encapsulated, and this is repeated for each phase, forming one cast body section per phase. With this partial encapsulation, the coil assembly 5 thus forms a multi-part cast body. The individual cast body sections are pushed together axially to form the coil assembly 5. This embodiment has the advantage that less force is required for demoulding the cast body sections compared to demoulding the full cast body and that the stress on the components is reduced overall. The same tool 20' can be used for all cast body sections.

However, the embodiment with cast body sections results in an axially larger constructed size of the winding heads 7, 8 by several millimetres, since each winding head 7, 8 has an insulating layer of sealant with a thickness of 1-2 mm respectively on its two axial face ends, and these are added up when stacking the cast body sections. The monolithic (one-piece) cast body on the other hand has a smaller axial constructed size of the winding heads for the same output or power density (up to 1.6 cm in total), because the coils lie closely against each other there without intermediate insulation. The performance of a coil assembly 5 produced as a full cast body is therefore better.

Note that the preceding description is merely exemplary for the purpose of illustration and in no way limits the scope of protection of the invention. Characteristics of the invention designated as "can", "exemplary", "preferred", "optional", "ideal", "advantageous", "where applicable", "appropriate" or the like are merely elective and in no way limit the scope of protection, which is established exclusively by the claims. Insofar as elements, components, process steps, values or information are cited in the preceding description that have known, obvious or foreseeable equivalents, these equivalents are also covered by the invention. Furthermore, the invention encompasses all changes, variations or modifications of embodiments of the invention that involve the exchange, addition, change or omission of elements, components, process steps, values or information, as long as the fundamental concept according to the present invention is preserved, regardless of whether the changes, variations or modifications result in an improvement or an impairment of an embodiment.

Although the preceding description of the present invention identifies numerous material/immaterial characteristics or characteristics pertaining to the subject matter of the proceedings in reference to one or more concrete embodiment(s) of the invention, these characteristics can also be used in isolation from the concrete embodiment of the invention, at least insofar as they do not require the mandatory presence of additional characteristics. Conversely, these characteristics mentioned in reference to one or more concrete embodiment(s) of the invention can be combined at will with each other and with additional disclosed or undis-
closed characteristics or embodiments of the invention that
are not shown, at least to the extent that these characteristics
do not mutually exclude each other or result in technical
incompatibilities.

The invention claimed is:

1. An electric motor for a deep well vertical turbine pump,
comprising a stator assembly having a stator bore configured
to hold a rotor and slots that are radially open to inside the
stator bore and separated from each other by respective
stator teeth, electrical conductors made of round wire of
coils of a coil assembly lying in the slots, distributed
windings on one axial end of the coil assembly forming a
winding head in which the coils are encapsulated, wherein
the winding head extends only between an inner diameter
and an outer diameter that is smaller than the diameter of the
stator bore, and the coil assembly is axially inserted into the
slots of the stator assembly, wherein each of the coils on the
winding head have at least:

a first radial segment that connects to a first longitudinal
coil segment projecting from a first of the slots of the
stator assembly, a first curved segment connected to the first radial seg-
ment and extending helically along a first arc to a
second of the slots of the stator assembly in which a
second longitudinal coil segment lies, and a second radial segment that connects the first curved
segment to the second longitudinal coil segment.

2. The electric motor according to claim 1, wherein the
coils are individually encapsulated coils that are nested
inside each other.

3. The electric motor according to claim 2, wherein the
curved segment extends helically to the stator assembly.

4. The electric motor according to claim 3, wherein each
of the coils on the winding head also have:

a second curved segment connected to the second radial
segment and extending helically toward the stator
assembly along a second arc, in which the two arcs lie on different diameters and the
curved segments are connected to each other by a
connecting segment.

5. The electric motor according to claim 1, wherein the
coil assembly forms a cast body in one or more parts in
which multiple or all the coils together with the winding
head are encapsulated, or the coil assembly is formed by a
multi-part cast body of cast body sections axially inserted
into each other in which the coil or coils of each phase are
encapsulated together in each of the cast body sections.

6. The electric motor according to claim 5, wherein a
second coil of each phase lies in a first slot and a second slot
diametrically opposite the first, and a first and third coil of
each phase lie in respective ones of two slots that lie in a
same circumferential semi-circle in reference to the second
coil.

7. The electric motor according to claim 6, wherein the
second coil consists of two coil sections or, at least in the
winding head, is divided into two coil sections, the two
sections in the winding head extending in opposite circum-
ferential directions from the first slot to the second slot.

8. A method for manufacturing an electric motor accord-
ing to claim 1, comprising the steps:

providing a stator assembly that has a stator bore config-
ured to hold a rotor and slots that are radially open to
inside the stator bore and separated from each other by
respective stator, manufacturing a coil assembly of encapsulated coils by
encapsulating coils made by winding round wire electrical conductors so that the coils form distributed
windings and, at one axial end of the coil assembly, a
winding head that extends only between an inner
diameter and an outer diameter that is smaller than the
diameter of the stator bore, and axially inserting the coil assembly into the stator assem-
bly, leading with the winding head, so that the coils are
positioned to lie in the slots.

9. The method according to claim 8, wherein the respec-
tive coils are wound and encapsulated separately and nested
inside each other to form the coil assembly.

10. The method according to claim 8, wherein the coils
are inserted into a tool comprising a cylindrical winding
support having a rear winding support segment and a front
winding support segment, in which a number of fins corre-
sponding to the stator teeth is mounted on an outer circum-
ference of the rear winding support segment and there is a
longitudinal cavity between each two of the fins adjacent to
each other in a circumferential direction of the rear winding
support segment, and the front winding support segment is
radially offset compared to the rear winding support seg-
ment, forming an annular space between the front winding
support segment and the fins that is open towards an
insertion end in which the coils are inserted into the longi-
tudinal cavities so that a winding head segment of each of
the coils forming part of the winding head lies in the annular
space and the coils are encapsulated in the tool.

11. The method according to claim 10, wherein each of
the coils is wound individually and inserted into the tool as
a wire bundle or the coils are wound into wire bundles one
after the other directly in the tool using a needle winding
device.

12. The method according to claim 11, wherein a wire
bundle of a coil is inserted into the tool so that it extends
radially through a first of the longitudinal cavities into the
annular space, extends in a curve to a second longitudinal
cavity and emerges from it again radially.

13. The method according to claim 12, wherein the wire
bundle is pressed in the annular space using a first cylindri-
cal heading tool guided on the front winding support seg-
ment in a direction of the rear winding support segment in
order to form a winding head segment of the coil that forms
part of the winding head.

14. The method according to claim 13, wherein the wire
bundle is pressed using a second cylindrical heading tool
guided on an outside of the fins to an axial end of the
winding support opposite to the insertion end, so that the
wire bundle wraps around the fins with increasing tension on
the outer circumference to form a second winding head
segment of the coil forming part of a second winding head.

15. The method according to claim 14, wherein a first
sleeve that radially seals the longitudinal cavities is slid onto
the fins and a second sleeve that radially delimits the second
winding head is positioned around the second winding head,
so that the first and second sleeves form delimiters of a
casting mould that contains the coils and in which the coils
are encapsulated.

16. The tool for manufacturing a coil assembly of dis-
tributed windings for axial insertion into a stator assembly of
an electric motor, the stator assembly having slots that are
radially open to an inside and separated from each other by
respective stator teeth, comprising a cylindrical winding
support with a number of fins corresponding to the stator
teeth mounted on its outer circumference and there is a
respective longitudinal cavity between each two of the fins
adjacent to each other in a circumferential direction of the
winding support and the winding support has a rear winding support segment and a front winding support segment that is radially offset compared to the rear winding support segment, forming an annular space between the front winding support segment and the fins which is open towards an insertion end in an axial direction.

17. The tool according to claim 16, wherein a first cylindrical heading tool lies in the annular space so that it is axially moveable and guided on the front winding support segment to press a coil in a direction of the rear winding support segment, forming a segment of the coil lying in a winding head.

18. The tool according to claim 17, wherein a second cylindrical heading tool is guided on the fins so as to be axially moveable in order to press the coil radially into a first and a second longitudinal cavities and to a second axial end of the winding support that is opposite to the insertion end.

19. The tool according to claim 18, wherein a first sleeve radially seals the longitudinal cavity and is configured to slide onto the fins, and a second sleeve radially delimits an annular space axially opposite to the insertion end for a second winding head of the coil so that the first and second sleeves form delimiters of a casting mould in which the coils are encapsulated.

* * * * *